US012183103B2

(12) United States Patent
Sanctis et al.

(10) Patent No.: US 12,183,103 B2
(45) Date of Patent: Dec. 31, 2024

(54) FINGER TRACKING TO WRITE ON OR CORRECT MISTAKES ON PHYSICAL DOCUMENTS

(71) Applicant: Bank of America Corporation, Charlotte, NC (US)

(72) Inventors: Jennifer Sanctis, Charlotte, NC (US); Mary Bangs, New York, NY (US); Veronica Andrea Cadavid, New York, NY (US); Taylor Farris, Hoboken, NJ (US); Trish Gillis, Chicago, IL (US); Jesse James Godley, Charlotte, NC (US); Brian Meyers, New York, NY (US); Vishwas Korde, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/200,922

(22) Filed: May 23, 2023

(65) Prior Publication Data

US 2024/0395063 A1   Nov. 28, 2024

(51) Int. Cl.
| | |
|---|---|
| *G06V 30/228* | (2022.01) |
| *G01S 13/58* | (2006.01) |
| *G01S 13/88* | (2006.01) |
| *G06F 3/01* | (2006.01) |
| *G06F 3/041* | (2006.01) |
| *G06V 40/13* | (2022.01) |

(Continued)

(52) U.S. Cl.
CPC ............ *G06V 30/228* (2022.01); *G01S 13/58* (2013.01); *G01S 13/88* (2013.01); *G06F 3/017* (2013.01); *G06F 3/0418* (2013.01); *G06V 40/1306* (2022.01); *G06V 40/376* (2022.01); *G06V 40/70* (2022.01); *G06F 2203/04101* (2013.01)

(58) Field of Classification Search
CPC ....... G06V 30/228; G01F 13/58; G06F 3/017; G06F 2203/04101
See application file for complete search history.

(56) References Cited

U.S. PATENT DOCUMENTS

| | | | |
|---|---|---|---|
| 10,782,698 B1 * | 9/2020 | Baumann | G01C 21/362 |
| 11,120,255 B2 * | 9/2021 | Lu | H01P 1/20 |

(Continued)

*Primary Examiner* — William Boddie
*Assistant Examiner* — Bipin Gyawali
(74) *Attorney, Agent, or Firm* — Weiss & Arons LLP

(57) ABSTRACT

Systems and methods for transferring data via a finger tracking smart device from a first user interface ("UI") to a second UI is provided. The data transferred may be documentation data, including signatures and corrections. The finger tracking smart device may include one or more smart lenses. Methods may include triggering a tracking of the movement of the user's fingers on the first UI and further tracking a start point and an end point of the movement of the user's fingers based on detection of deliberate movements and gestures. Methods may further include capturing a segment of data within the start point of movement and the end point of movement and storing the segment of data in memory on the finger tracking smart device. Methods may further include updating the second UI based on an instruction in a data packet transmitted to the second UI, by inputting the segment of data at a point of movement of the user's fingers on the second UI.

18 Claims, 10 Drawing Sheets

(51) Int. Cl.
*G06V 40/30* (2022.01)
*G06V 40/70* (2022.01)

(56) References Cited

U.S. PATENT DOCUMENTS

| | | | | |
|---|---|---|---|---|
| 2007/0130547 | A1* | 6/2007 | Boillot | G06F 21/36 |
| | | | | 715/863 |
| 2008/0120102 | A1* | 5/2008 | Rao | G10L 15/22 |
| | | | | 704/E15.04 |
| 2017/0097413 | A1* | 4/2017 | Gillian | G06F 21/6245 |
| 2020/0311682 | A1* | 10/2020 | Olshansky | G10L 15/26 |
| 2023/0000058 | A1* | 1/2023 | Baker | A01K 5/02 |
| 2023/0007085 | A1* | 1/2023 | Berliner | G06F 3/04815 |

\* cited by examiner

FINGER TRACKING TO WRITE ON OR CORRECT MISTAKES ON PHYSICAL DOCUMENTS

FIELD OF TECHNOLOGY

Aspects of the disclosure relate to providing systems and methods for use of finger tracking. In particular, the disclosure relates to systems and methods for using finger tracking smart devices for documentation purposes.

BACKGROUND OF THE DISCLOSURE

Documentation is a basic, yet important, part of any entity, organization, or company. Every detail is important, and accuracy and efficiency are crucial in documentation.

Documentation includes, for example, inputting signatures and fixing mistakes in physical documents. Signatures are usually handwritten on a printed document or e-signatures may be provided using a mouse or keyboard. Fixing document mistakes usually requires handwriting corrections or editing documents on a computer interface, which may be tedious and time consuming. Furthermore, accuracy may degrade over time because of the repetitive nature of the tasks involved.

It is desirable, therefore, to provide systems and methods that use wearable and non-wearable finger tracking devices to capture data from one UI and paste the data into one or more additional UI's.

It is further desirable to utilize smart devices, for example, smart glasses or other smart wearables, with finger tracking through a camera lens, radar, or specific wearable device.

It is even further desirable to translate the finger tracking performed by a finger tracking smart device and/or smart lens into specific documentation actions, such as writing a signature or correcting a mistake in both digital and physical documents.

SUMMARY OF THE DISCLOSURE

Provided herein is a finger tracking device or smart lens, both wearable and non-wearable, configured to track movements of one or more fingers for signatures and corrections on physical documents. As a non-limiting example, a wearable device may be worn on a user's hand to biometrically track finger movements. As another non-limiting example, a non-wearable device may use radar or video to track finger movements. The finger tracking device may be located, for example, on smart glasses, smart phones, smart watches, smart devices, lapels, clothing, hands, wrists, or fingers of a user.

The finger tracking device or smart lens may include a micro camera operable to capture data from the first UI and from the second UI. The finger tracking device or smart lens may further include a memory unit for storing the data captured from the first UI and from the second UI.

The finger tracking device or smart lens may also include a sensor configured to capture the user's finger movements. The finger tracking device or smart lens may further include a loop antenna configured to enable radio frequency communication.

The finger tracking device or smart lens may include a light emitting diode ("LED") attached to a substrate on the wearable finger tracking device. The LED may be connected to a microcontroller. The microcontroller may be operable to move the LED. The LED may be operable to transmit the data captured at the first UI to the second terminal.

The finger tracking device or smart lens may include a microprocessor operable to capture, store and transmit data to a receiver at the first terminal and the second terminal.

A user, within an augmented reality or virtual reality environment may write or perform other gestures with one or more fingers. The finger tracking device or smart lens may translate the writing or gestures into actions within the AR/VR environment.

For example, the user may endorse a check using a finger writing a signature. The finger tracking device or smart lens may detect the finger gesture and translate it into a document signature, e.g., an endorsement. The endorsement may be recorded on a virtual copy of the check. If the user is authenticated, that virtual copy may be transferred to a bank or elsewhere and act as a fully endorsed and valid check.

Another example of the present disclosure may include using a finger tracking device or smart lens to detect and make corrections to one or more documents.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

disclosure.

Figure 7:
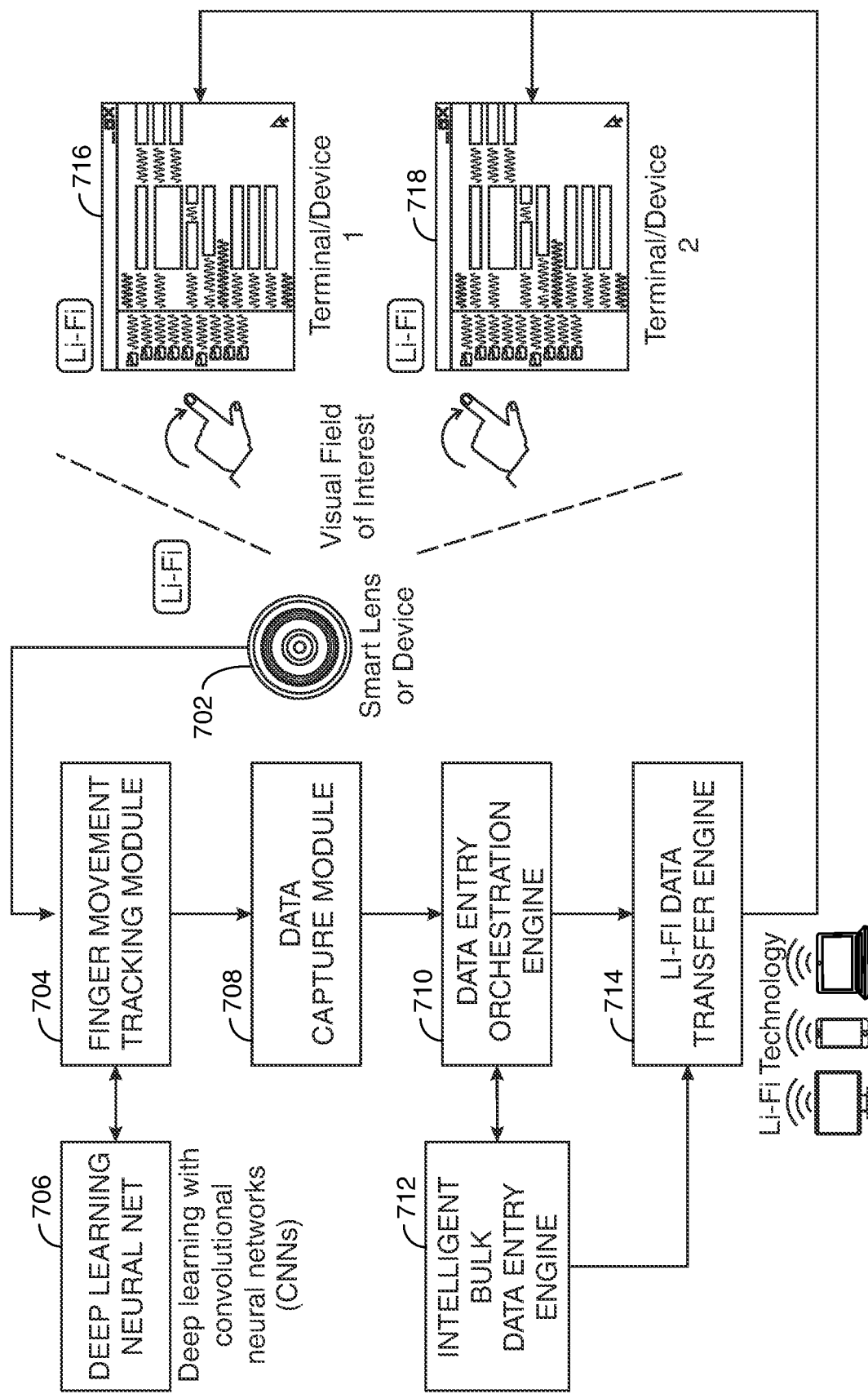

FIG. 7 shows an illustrative system in accordance with principles of the

Figure 8:
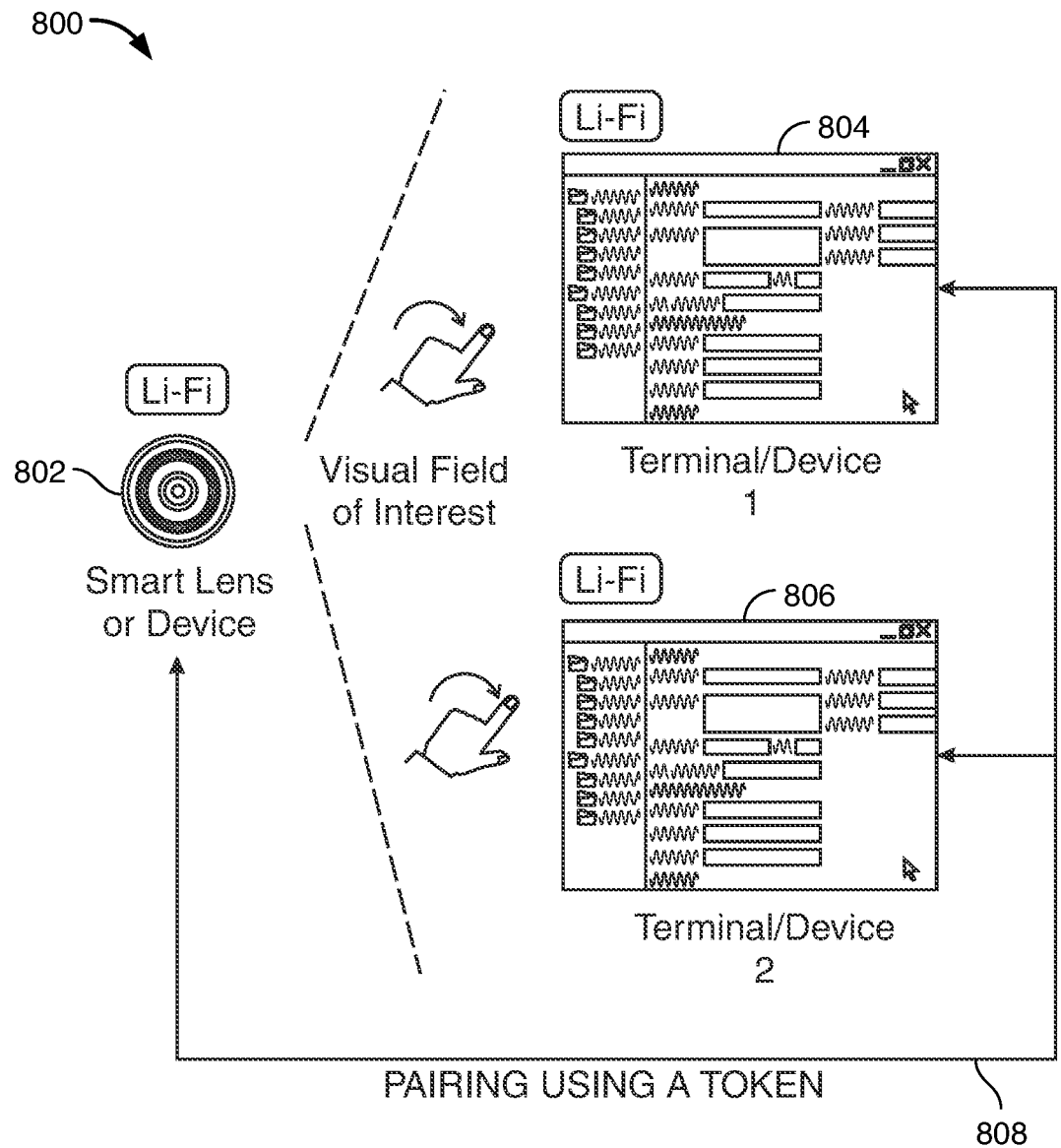

FIG. 8 shows an exemplary diagram in accordance with principles of the disclosure.

Figure 9:
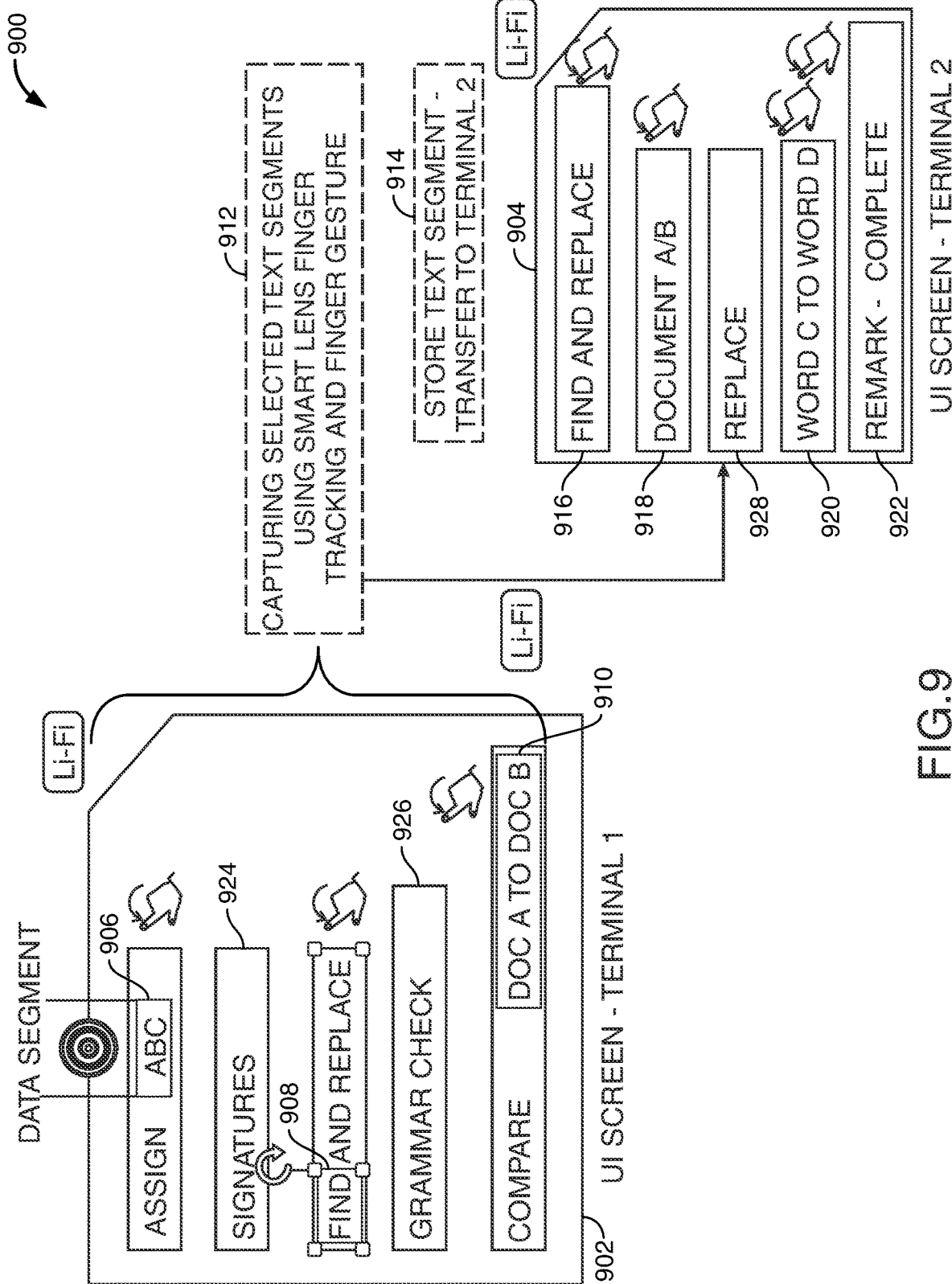

FIG. 9 shows an illustrative diagram in accordance with principles of the disclosure.

Figure 10:
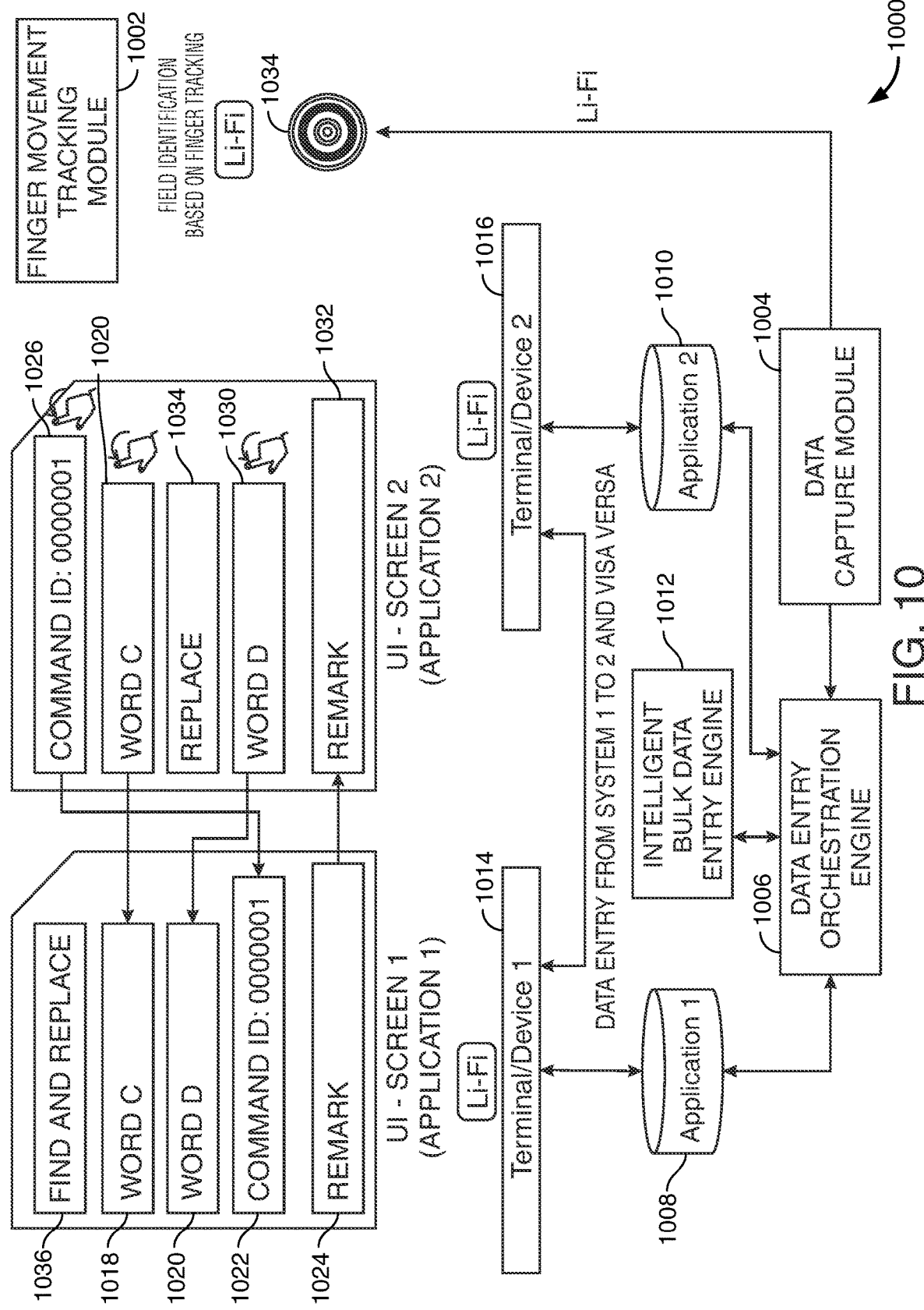

FIG. 10 shows illustrative systems and methods in accordance with principles of the disclosure.

DETAILED DESCRIPTION OF THE DISCLOSURE

A data entry system leveraging smart lenses is provided. The data entry system may include a first terminal supporting a first user interface ("UI"), a second terminal supporting a second UI and one or more smart lenses. The smart lens may be enabled to communicate and transmit data using light fidelity ("Lifi").

The first terminal may include a Lifi receiver. The second UI may also include a Lifi receiver.

A terminal for the purposes of the disclosure may include a computing device. The computing device may be independent from another computing device. The computing device may be a computer, Ipad, laptop, tablet, mobile device and any other suitable computing device.

The finger tracking device or smart lens may be configured for location on a user. For the purposes of this disclosure, a smart lens may be understood to mean an interactive lens. A smart lens may be made from materials used for wearable lenses such as soft and pliable plastic.

In some embodiments, the smart lens may be a first smart lens in a first location. The system may also include a second smart lens in a second location. The two smart lenses may be a pair of smart lenses.

A smart lens may include one or more internal processors. The one or more internal processors may include one or more microprocessors.

In addition to the processors, the smart lens may also include hardware components associated with conventional lenses.

The smart lens may include a micro camera. The micro camera may be operable to capture data from the first UI and from the second UI and from any additional UI that may be included in the system.

The smart lens may include a memory unit. The memory unit may be for storing the data captured from the first UI and from the second UI.

The smart lens may include one or more sensors. The sensors may be configured to capture a user's finger movements. Sensors may include the camera. Sensors may also include piezoelectric sensors, infrared sensor and/or an acceleration sensor. These micro electronic sensors may be configured to measure changes in pressure, temperature, acceleration and force. The smart lens may be configured to use the measurement and translate them into control instructions.

The smart lens may include an antenna. The antenna may be a loop antenna. The antenna may be configured to enable radio frequency communication.

The smart lens may include Lifi capabilities. The smart lens may include a light emitting diode ("LED"). The LED may be attached to a substrate on the smart lens. The LED may be connected to a microcontroller and/or a microprocessor. The LED may be operable to transmit the data captured at the first UI to the second terminal. The LED may be operable to transmit data captured from the second UI to the first terminal. The LED may be operable to transmit data to any one or more additional computing devices.

Lifi is a two-way network protocol for high speed connectivity using light technology. LiFi is a light-based communication system capable of transmitting data wirelessly at high speed using light emitting diodes (LEDs). LiFi transmission speeds may be more than one hundred times faster than conventional WiFi. LiFi infrastructure is also relatively simple, in contrast with the radio transmitters and antennae required for WiFi communications. The speed of LiFi transfer may enable real-time parallel processing of large-scale files, vastly improving processing efficiency. The speed of LiFi transmission may also limit data leakage and thus protect against adversarial attacks during the data transmission process.

LiFi may capture data in modulated light frequencies. The driver-circuit in LED bulbs may encode and transmit data by switching the LED on and off at rates so fast that the flickering is indiscernible to the human finger. The data may be decoded by an optical sensor on the receiving end and converted back into an electronic data stream.

In some embodiments, LED bulbs may be dimmed to levels below human visibility while still emitting enough light to carry data. LiFi technology presents a number of advantages over conventional WiFi. One advantage is transmission speed. LiFi transfers may occur at speeds 100 times faster than conventional WiFi.

Another advantage is capacity. WiFi relies on the radio frequency spectrum which is subject to congestion and slowing due to high traffic. LiFi, on the other hand, uses the visible light spectrum which is 10,000 times larger than the radio bandwidths and is therefore not limited by spectrum capacity.

While WiFi frequencies may eventually become crowded and slower when large amounts of data are transferred, LiFi is able to deliver consistent large data transfers. Additionally, unlike WiFi, LiFi frequencies may be used in electromagnetic sensitive areas without causing interference. LiFi infrastructure is also relatively simple, in contrast with the radio transmitters and antennae required for WiFi communications.

The limited hardware required for LiFi communications also improves energy efficiency.

The smart lens may be exposed to light, mechanical movement, and electromagnetic conduction and may harvest energy from these sources.

The microprocessor may be operable to capture, store and transmit data to a receiver at the first terminal and the second terminal.

One or more software modules may execute on the processors. The one or more software modules may be stored in a memory located within the smart lens. The one or more software modules may, in the alternative, be referred to as applications. The applications may enable the smart lens to execute various tasks.

The microprocessor may execute a finger movement tracking application. The finger movement tracking application may execute a finger tracker application. Alternatively, the finger movement tracking application may be the finger tracker application. Sensors may be controlled by the finger tracking application executed on the smart lens's microprocessor. Finger position data detected by the sensors may be collected by the finger tracking application. Finger position data detected by the sensors may be stored in a memory embedded in the smart lens. Sensors for tracking user finger position may include cameras. In some embodiments, the cameras may be combined with illuminators. The illuminators may include a near infrared light source or any suitable light source.

One method of tracking user finger position involves finger movement vectoring. Finger movement vectoring is a method for remote, non-intrusive finger tracking. A light source illuminates the finger causing visible reflections and a camera captures an image of the reflections. A vector is calculated based on the angles between the finger reflections. The direction of the vector combined with other geometrical features of the reflections may be used to determine finger position. Finger position may include finger movement direction.

In some embodiments, the smart lens may include multiple cameras per finger for increased accuracy in measuring finger movement direction. The smart lens may include accelerometer, gyroscope, and magnetometer sensors to provide differentiation between hand and finger movements. The smart lens may include slippage compensation and persistent calibration to enable integrating the smart lens with the development platform may enable a user to develop applications in a hands-free manner.

The system may include a camera associated with the external computing device display. The camera may determine the proximity of the smart lens to the display.

In some embodiments, the smart lens may continuously transmit finger position data while in proximity to the external display. In some embodiments, the smart lens may transmit the finger position data at periodic intervals.

In some embodiments, the smart lens may terminate or pause the transmission when the smart lens is no longer within a predetermined proximity to the display. In some embodiments, the smart lens may terminate or pause the transmission when the sensor fails to detect a finger position associated with finger movement on the display for a predetermined period.

The camera associated with the external computing device may determine the position of the user hand with respect to the display. The user hand position may be periodically or continuously determined. Hand position data may be synchronized with finger position data from the smart lens sensor. User finger movement direction combined with user hand position may be extrapolated to determine a fixation point on the display and identify the corresponding screen coordinates.

The external computing device may include a smart lens interface. The smart lens interface may receive finger position data from the smart lens. The smart lens interface may determine the relevance of the finger position data. The determination may be based on a level of finger movement. Finger position data may be associated with finger movement based on any suitable metric.

Metrics for tracking finger position may include a determination of finger movement points. One finger movement point may equal one raw sample captured by the finger tracker. Fixation may occur when a finger movement point is maintained for a specific amount of time. Fixation may be associated with finger movement. Fixation may be associated with a threshold level of finger movement.

The finger movement tracking application may be configured to determine the movement of the user's finger on the first UI. The movement of the user's finger may be determined when the user's finger is moved in the direction of the first UI.

When a user's finger movement is determined to be within range of the first UI, the finger movement tracking application is further configured to determine a point of the movement of the user's finger on the first UI. The point of movement may be the location on the UI that includes data that the user may want to capture, for example, for a copy and paste operation. The point of movement may be directed to a data entry field associated with a data entry field identifier within the first UI.

Each UI may display a page of an application. An application may include one or more fillable forms. An application may be one page displayed on the UI. An application may include a plurality of pages. Each page may include a plurality of data entry fields and associated data entry field identifiers. The data entry field identifiers may be the name of the type of data entry field. The data entry field may include the value of the identifier. At the first UI, the value may be included in the data entry field. At the second UI, the data entry fields may be blank, and the values may be filled in using the smart lens.

The finger movement capturing application may detect a deliberate finger gesture while gazing at the point of movement. The deliberate finger gesture may be a movement of the finger that may be longer than an average movement of a finger. An average movement of a finger may be between 0.2 second and 0.4 seconds. When the movement of the finger is determined to be longer than the average finger movement, the finger movement capturing application may determine the finger movement to be a deliberate finger gesture.

In response to the detection, the system may be configured to identify a data segment at the point of movement within the data entry field.

The data capturing application may then be executed. The data capturing application may be configured to capture the data segment and the associated data entry field identifier using the micro camera. The data segment and the associated data entry field identifier may be stored in the memory of the smart lens.

In response to a detection of the point of movement of the user's finger on the second UI, the finger movement tracking application may be further configured to detect a deliberate finger gesture while gazing at the point of movement on the second UI.

The LED at the smart lens may be configured to transmit a data packet to the second terminal. The data packet may be compiled at the smart lens. The data packet may include the data segment, the associated data entry field identifier from the smart lens and an instruction to update the second UI to incorporate the data segment at the point of movement of the user's fingers on the second UI.

The Lifi receiver at the second terminal may be configured to receive the data packet.

It should be appreciated that the Lifi receiver at the first terminal and the Lifi receiver at the second terminal made include a photodetector or a camera and upon receipt may be responsible for re-transcribing a luminous signal transmitted by the LED into an operational electrical signal.

A processor at the second terminal may be configured to update the second UI by inputting the data segment at the point of movement at the second UI.

In some embodiments, prior to capturing data from the first UI and/or the second UI, the system may be configured to initiate a pairing of the smart lens to each of the first and second terminal. The pairing may include authenticating the smart lens at the terminal. The Lifi receiver at the first terminal may receive, via the LED, a token i.e.—a password, stored at the smart lens. The token may then be verified at the terminal.

In some embodiments, the system may include a third terminal. The third terminal may support a third UI. The third UI may include a Lifi receiver. Following the inputting of the data segment at the point of finger movement at the second UI, the finger movement tracking module may be further configured to detect a deliberate finger gesture while gazing at a point of finger movement at the third UI. In response to the detection of the point of finger movement at the third UI, the Lifi data transfer engine may execute the LED to transmit a data packet compiled at the smart lens to the third terminal.

The data packet may include the data segment, the associated data entry field identifier from the smart lens and an instruction to update the third UI to incorporate the data segment at the point of finger movement of the user's fingers on the third UI. The Lifi receiver at the third terminal may be configured to receive the data packet. A processor at the third terminal may be configured to update the third UI by inputting the data segment at the point of finger movement at the third UI.

In some embodiments, prior to storing the data segment captured, the microprocessor may be configured to confirm an accuracy of the data segment. The confirming may include instructing a display on the smart lens to trigger an augmented reality display to a user of the smart lens of the data segment.

The user may view the data segment as an augmented reality display through the smart lens. When the data segment is accurate, the system may be configured to receive verification from the user by detecting a single deliberate finger gesture following the displaying of the data segment. In response to the single deliberate finger gesture, the data segment may be stored in memory of the smart lens.

If the data segment is not accurate, the system may detect a double deliberate finger gesture. In response to the double deliberate finger gesture, the microprocessor may be configured to instruct the display to trigger the augmented reality display to the user confirming the deletion of the data segment. The system may be further configured to execute the data capturing application to determine a second point of movement of the user's finger on the first UI. When determining the second point of movement, the system may re-execute the finger movement tracking application to detect the point of movement of the user's finger at the first UI.

It should be appreciated that the system may not be limited to single and double finger gestures. In some embodiments, the length of each deliberate finger gesture may be indicative of a point of movement. In other embodiments, multiple deliberate finger gestures may be indicative of a point of movement.

One or more non-transitory computer-readable media storing computer-executable instructions which, when executed by a processor on a computer system, perform a method for transferring data from a first light fidelity ("Lifi") enabled user interface ("UI") to a second Lifi enabled UI. The transferring may leverage smart lenses via Lifi transmission. The smart lenses may be positioned to view a user's fingers.

It should be appreciated that the first UI may be located on a first computing device and the second UI may be located on a second computing device. The first and second computing device may be independent of each other and may not be wirelessly linked to each other.

The method may include detecting the movement of the user's fingers on the first UI. In response to the detection, the method may include triggering a tracking of the movement of the user's fingers.

When a first deliberate gesture is identified, the method may include tracking a start point of the movement of the user's fingers. A deliberate gesture may be determined when a time period of movement of the fingers is greater than a pre-determined time period. The pre-determined time period may be the average length of time of a finger movement.

When a second deliberate gesture is identified, the method may include tracking an end point of the movement of the user's fingers. The start point and end point may be tracked by tracking the x and y coordinates of the UI based on the movement of the user's fingers.

The method may further include capturing a segment of data between the start point of movement and the end point of movement. In some embodiments, the data segment may include the data at the start point and at the end point. In some embodiments, the data segment may include only the data between the start and the end point.

Following the capturing, the method may include storing the segment of data in memory on the smart lens.

The method may further include detecting the movement of the user's fingers on the second UI. In response to the detection, the method may include tracking a point of movement of the user's fingers on the second UI. The method may further include transmitting to the second UI, using an LED, a data packet. The data packet may include the segment of data stored in the memory. The data packet may also include the point of movement of the user's fingers on the second UI. The data packet may also include an instruction to update the second UI to incorporate the segment of data at the point of movement of the user's fingers on the second UI.

Following the receipt of the data packet, the method may further include updating the second UI based on the instruction by inputting the segment of data at the point of movement on the second UI.

Following the updating, the method may further include detecting the user's finger movement on a third UI of a third terminal. At the third UI, the method may include tracking a point of movement of the user's fingers on the third UI.

The method may further include transmitting the data packet from the memory to the third UI. Following transmitting of the segment of data into the third UI, the method may further include identifying pre-trained data associated with the data segment and automatically transmitting the data packet to a fourth, fifth, and sixth UI based on the pre-trained data.

It should be appreciated that the segment of data may be within a data entry field associated with a data entry field identifier on the first UI. The method may include, prior to updating the second UI, verifying that the point of movement of the user's fingers on the second UI is pointing at a data entry field associated with a data entry field identifier correlating to the data entry field identifier on the first UI.

For example, when a data segment is copied from a data entry field identifier at the first UI listed as "user ID," the method may include verifying that the point of movement detected at the second UI, is direct to a data entry field associated with the same data entry field identifier "user ID" at the second UI.

If the data entry field associated with a data entry field identifier on the second UI does not correlate to the data entry field identifier on the first UI, the method may include transmitting an error message on an augmented reality display of the smart lens. Following the transmitting, the method may include repeating the tracking of the point of movement of the user's fingers on the second UI.

In some embodiments, when the data entry field associated with a data entry field identifier on the second UI does not correlate to the data entry field identifier on the first UI, the method may include searching through each data entry field identifier on the second UI to identify a data entry field identifier correlating to the identifier of the first UI. When a correlating data entry field identifier is identified, the method may include transmitting the data packet to the second UI. The data packet may include the segment of data stored in the memory. The data packet may also include the identified correlating data entry field identifier. The data packet may also include an instruction to update the second UI to incorporate the segment of data at the data entry field associated with the identified correlating data entry field identifier on the second UI.

In some embodiments when the start point of the movement of the user's fingers is at a first data entry field on the first UI and the end point of the movement of the user's fingers is at a last data entry field on the first UI, the method may include performing a bulk capturing of the data. The bulk capturing may include capturing each segment of data within each data entry field on the first UI. The method may further include capturing, for each segment of data, an associated data entry field identifier displayed on the first UI. The method may further include storing each segment of data and the associated data entry field identifier on the smart lens.

Following the storing, the method may include detecting the movement of the user's fingers on the second UI. in response to the detecting, the method may include transmitting to the second UI using Lifi, a data packet. The data packet may include each segment of data and the associated data entry field identifier stored in the memory. The data packet may also include an instruction to update the second UI. The instruction may include for each segment of data being transmitted, inputting each segment of data on the second UI within a data entry field associated with a data entry field identifier correlating to the data entry field identifier displayed on the first UI.

In response to the receipt of the data packet by the processor at the second UI, the method may include updating the second UI based on the instruction.

In one embodiment, a user may write or perform other gestures with one or more fingers within an augmented reality (AR) or virtual reality (VR) environment.

In another embodiment, a finger tracking device or smart lens may translate writing or gestures by a finger in space into actions within an AR/VR environment. For example, the user may endorse a check using a finger to write a signature in space.

In yet another embodiment, the finger tracking device or smart lens may detect the finger gesture and translate it into a document signature, for example, an endorsement.

In an additional embodiment, an endorsement may be recorded on a virtual copy of a check.

In yet at additional embodiment, if the user is authenticated, that virtual copy may be transferred to a bank, third party, or elsewhere, and act as a fully endorsed and valid check.

In yet one more embodiment, a finger tracking device or smart lens may detect one or more finger movements to make one or more corrections to one or more documents.

In another embodiment of the disclosure, when one or more corrections are made to one or more documents, an original of the one or more documents is automatically saved on a first user interface ("UI").

In another embodiment of the disclosure, when one or more corrections are made to one or more documents, a redline of the corrections made to the one or more documents is automatically saved on a second UI.

In another embodiment, when one or more corrections are made to one or more documents, a redline of the corrections made to the one or more documents may be automatically saved on the first UI.

In yet another embodiment of the disclosure, when one or more corrections are made to one or more documents, both an original of the one or more documents and a redline of the corrections made to the one or more documents are automatically saved on both a first and a second UI.

In an embodiment, a data entry system is provided leveraging one or more smart lenses.

In another embodiment, the data entry system has a first terminal supporting a first UI and a light fidelity ("Lifi") receiver.

In another embodiment, the data entry system has a second terminal supporting a second UI and a Lifi receiver.

In another embodiment, the data entry system has a smart lens configured for location within a threshold distance of a user.

In one embodiment, the smart lens has a micro camera operable to capture data from the first UI and from the second UI.

In one embodiment, the smart lens has a memory for storing the data captured from the first UI and from the second UI.

In one embodiment, the smart lens has one or more sensors configured to capture the smart lens's point of gaze.

In one embodiment, the smart lens has a loop antenna configured to enable radio frequency communication.

In an embodiment, the system has a light emitting diode ("LED") attached to a substrate on the smart lens, the LED connected to a microcontroller, and the LED operable to transmit the data captured at the first UI to the second terminal.

In another embodiment, the system has a microprocessor operable to capture, store and transmit data to the Lifi receiver at the first terminal and the second terminal.

In another embodiment, the smart lens, via the microprocessor, may be configured to execute a plurality of applications (e.g., executable instructions stored in a non-transitory memory on the smart lens).

In another embodiment, the smart lens may be configured to execute a finger movement tracking application. The finger movement tracking application may be configured to determine a movement of the user's one or more fingers on the first UI, determine a point of movement of the user's one or more fingers on the first UI, the point of movement directed to a data entry field associated with a data entry field identifier within the first UI, detect a deliberate finger gesture while gazing at the point of movement; and in response to the detection, identify a data segment at the point of movement within the data entry field.

In another embodiment, the smart lens may have a data capturing application. The data capturing application may be configured to capture the data segment and the associated data entry field identifier using the micro camera and store the data segment and the associated data entry field identifier in the memory of the smart lens.

In another embodiment, the system is provided wherein, in response to a detection of the point of movement of the user's one or more fingers on the second UI, the finger movement tracking application is further configured to detect a deliberate finger gesture while gazing at the point of movement.

In another embodiment, the system is provided with a Lifi data transfer engine configured to, using the LED, transmit a data packet compiled at the smart lens to the second terminal, the data packet including the data segment, the associated data entry field identifier from the smart lens and an instruction to update the second UI to incorporate the data segment at the point of movement of the user's one or more fingers on the second UI.

In another embodiment, the system is provided with a Lifi receiver at the second terminal configured to receive the data packet.

In another embodiment, the system is provided with a processor at the second terminal configured to update the second UI by inputting the data segment at the point of movement at the second UI.

In another embodiment, the system is provided wherein prior to capturing data from the first UI the system further authenticates the user of the smart lens by performing a fingerprint scan on the user's one or more fingers.

In another embodiment, the system is provided wherein following the authenticating, the system further pairs the smart lens with the first terminal and the second terminal.

The system of claim 1 wherein the deliberate finger gesture is determined when a time period of finger movement is greater than a pre-determined time period.

In another embodiment, the system is provided wherein the system further has a third terminal supporting a third UI.

In another embodiment, the system is configured to detect a deliberate finger gesture, following the inputting of the data segment at the point of movement at the second UI, while gazing at a point of movement at the third UI.

In another embodiment, the system may have an LED configured to transmit a data packet compiled at the smart lens to the third terminal, the data packet including the data segment, the associated data entry field identifier from the smart lens and an instruction to update the third UI to incorporate the data segment at the point of movement of the user's one or more fingers on the third UI.

In another embodiment, the system may have a Lifi receiver at the third terminal is configured to receive the data packet.

In another embodiment, the system may have a processor at the third terminal configured to update the third UI by inputting the data segment at the point of movement at the third UI.

In another embodiment, the system is provided wherein prior to storing the data segment, the microprocessor is configured to confirm, via the user of the smart lens, an accuracy of the data segment.

In another embodiment, the system instructs a display on the smart lens to trigger an augmented reality display to a user of the smart lens of the data segment.

In another embodiment, the system receives verification from the user by detecting a single deliberate finger gesture, and following the detecting, stores the data segment in the memory of the smart lens.

In another embodiment, the system is provided wherein when a double deliberate finger gesture is detected, the microprocessor is configured to instruct the display to trigger the augmented reality display to the user confirming a deletion of the data segment.

In another embodiment, the system is provided wherein when a double deliberate finger gesture is detected, the microprocessor is configured to, in response to a confirmation, delete the data segment from the memory.

In another embodiment, the system is provided wherein when a double deliberate finger gesture is detected, the microprocessor is configured to execute the data capturing application to determine a second point of movement of the user's one or more fingers on the first UI.

In another embodiment, the system is provided wherein the smart lens is a first smart lens for a first finger or set of fingers and the system further has a second smart lens for a second finger or set of fingers.

In an embodiment, a system is provided with one or more non-transitory computer-readable media storing computer-executable instructions which, when executed by a processor on a computer system, perform a method for transferring data from a first light fidelity ("Lifi") enabled user interface ("UI") to a second Lifi enabled UI, the transferring leveraging one or more smart lenses via Lifi transmission, the one or more smart lenses positioned on a user's one or more fingers. The smart lenses may be gazing at the user's one or more fingers from a threshold distance.

In another embodiment, a system is provided for detecting a movement of the user's one or more fingers on the first UI.

In another embodiment, a system is provided for, in response to the detecting, triggering a tracking of the movement of the user's one or more fingers.

In another embodiment, a system is provided for, when a first deliberate finger gesture is identified, tracking a start point of the movement of the user's one or more fingers.

In another embodiment, a system is provided for, when a second deliberate finger gesture is identified, tracking an end point of the movement of the user's one or more fingers.

In another embodiment, a system is provided for capturing a data segment within the start point of movement and the end point of movement.

In another embodiment, a system is provided for storing the data segment in memory on the smart lenses.

In another embodiment, a system is provided for detecting the movement of the user's fingers on the second UI.

In another embodiment, a system is provided for, in response to the detecting, tracking a point of movement of the user's one or more fingers on the second UI.

In another embodiment, a system is provided for transmitting to the second UI, using a light emitting diode ("LED"), a data packet including the data segment stored in the memory, the point of movement of the user's one or more fingers on the second UI, an instruction to update the second UI to incorporate the data segment at the point of movement of the user's one or more fingers on the second UI.

In another embodiment, a system is provided for updating the second UI based on the instruction by inputting the data segment at the point of movement on the second UI.

In another embodiment, a system is provided wherein the first deliberate finger gesture is determined when a time period of a finger movement is greater than a pre-determined time period.

In another embodiment, a method is provided for detecting the movement of the user's one or more fingers on a third UI of a third terminal.

In another embodiment, a method is provided for tracking a point of movement of the user's one or more fingers on the third UI.

In another embodiment, a method is provided for transmitting the data packet from the memory to the third UI.

In another embodiment, a method is provided wherein following transmitting of the segment of data into the third UI, the method further identifies pre-trained data associated with the data segment and automatically transmits the data packet to a fourth, fifth, and sixth UI based on the pre-trained data.

In another embodiment, a method is provided wherein the segment of data is within a data entry field associated with a data entry field identifier on the first UI.

In another embodiment, a method is provided wherein prior to updating the second UI, the method involves verifying that the point of movement of the user's one or more fingers on the second UI is pointing at a data entry field associated with a data entry field identifier correlating to the data entry field identifier on the first UI.

In another embodiment, a method is provided wherein, in an event that the data entry field associated with a data entry field identifier on the second UI does not correlate to the data entry field identifier on the first UI, the method involves retracking the point of movement of the user's one or more fingers on the second UI.

In another embodiment, a method is provided wherein when the start point of the movement of the user's one or more fingers is at a first data entry field on the first UI and the end point of the movement of the user's one or more fingers is at a last data entry field on the first UI.

In another embodiment, the method involves performing a bulk capturing, including capturing each data segment within each data entry field on the first UI, capturing, for each data segment, an associated data entry field identifier displayed on the first UI.

In another embodiment, the method involves storing each data segment and the associated data entry field identifier on the smart lens, detecting the movement of the user's one or more fingers on the second UI, and, in response to the detecting, transmitting to the second UI using Lifi, a data packet.

In another embodiment, the method involves transmitting a data packet including a data segment and an associated data entry field identifier stored in memory, an instruction to update the second UI, wherein for each data segment being transmitted, inputting each data segment on the second UI within a data entry field associated with a data entry field identifier correlating to the data entry field identifier displayed on the first UI, and updating the second UI based on the instruction.

In another embodiment, a method is provided wherein the first UI is located on a first computing device and the second UI is located on a second computing device, wherein the first and second computing device are independent of each other and are not wirelessly linked to each other.

In yet an additional embodiment, a smart lens located on a user is configured for capturing data from a first user interface ("UI") and transmitting the data to a second UI, the transmitting leveraging light fidelity ("Lifi").

In an additional embodiment, a micro camera is made operable to capture data from the first UI and from the second UI. A micro camera may be operable to be moved by a microcontroller.

In another embodiment, a smart lens device may be configured with a memory for storing the data captured from the first UI and from the second UI.

In another embodiment, a smart lens device may be configured with a sensor configured to capture the user's one or more fingers' movements.

In another embodiment, a smart lens device may be configured with a loop antenna configured to enable radio frequency communication.

In another embodiment, a smart lens device may be configured with a light emitting diode ("LED") attached to a substrate on the smart lens, the LED connected to a microcontroller, the LED operable to transmit the data captured at the first UI to a second terminal supporting the second UI.

In another embodiment, a smart lens device may be configured with a microprocessor operable to capture, store and transmit data to a Lifi receiver at a first terminal and a Lifi receiver at the second terminal, the first terminal supporting the first UI.

In another embodiment, a smart lens device may be configured wherein, when the sensor detects a point of movement of the user's finger on the first UI, the microprocessor is operable to execute a finger movement tracking application configured to determine the point of movement of the user's one or more fingers on the first UI, the point of movement directed to a data entry field associated with a data entry field identifier within the first UI.

In another embodiment, a smart lens may detect a deliberate finger gesture while gazing at the point of movement.

In another embodiment, a smart lens, in response to a detection, may identify a data segment at the point of movement within the data entry field.

In another embodiment, a smart lens device may execute a data capturing application configured to capture the data segment and the associated data entry field identifier using the micro camera, and store the data segment and the associated data entry field identifier in the memory of the smart lens.

In another embodiment, a smart lens device may be configured to respond to detection of a point of movement of a user's one or more fingers on a second UI.

In another embodiment, a smart lens device may include a finger movement tracking application configured to detect a deliberate finger gesture while gazing at the point of movement.

In another embodiment, a smart lens device may include an LED is configured to transmit a data packet compiled at the smart lens to the second terminal, the data packet including the data segment, the associated data entry field identifier from the smart lens and an instruction to update the second UI to incorporate the data segment at the point of movement of the user's one or more fingers on the second UI;

In another embodiment, a smart lens device may include a Lifi receiver at the second terminal configured to receive the data packet.

In another embodiment, a smart lens device may include a processor at the second terminal configured to update the second UI by inputting the data segment at the point of movement at the second UI.

In another embodiment, a smart lens device is provided wherein the smart lens is a first smart lens on a first location of the user and the system further has a second smart lens on a second location of the user.

In another embodiment, a smart lens device is provided wherein prior to storing the data segment, the microprocessor is configured to confirm, via the user of the smart lens, an accuracy of the data segment.

In another embodiment, a smart lens device is provided for instructing a display on a smart lens to trigger an augmented reality display to a user of the smart lens of the data segment.

In another embodiment, a smart lens device is provided for receiving verification from the user by detecting a single deliberate finger gesture, and following the detecting, storing the data segment in the memory of the smart lens.

In another embodiment, a smart device may include a housing, a microprocessor disposed in the housing, a reader disposed in the housing and electronically coupled to at least the microprocessor, configured to read finger movements, and a screen disposed in the housing and electronically coupled to at least the microprocessor, configured to display document transaction options.

In another embodiment, a smart device may include a millimeter-wave radar transmitter disposed in the housing and electronically coupled to at least the microprocessor, wherein the radar transmitter is configured to provide a radar field in front of the housing with a height, depth, and width.

In another embodiment, a smart device may include a radar receiver disposed in the housing and electronically coupled to at least the microprocessor, wherein the radar receiver is configured to receive radar reflections from at least one object within the radar field, and wherein the at least one object is an individual finger of a hand belonging to a user.

In another embodiment, a smart device may include an analog-to-digital signal converter disposed in the housing and electronically coupled to at least the microprocessor and the radar receiver, wherein the signal converter is configured to convert analog radar reflections to digital data.

In another embodiment, a smart device may include a non-transitory memory disposed in the housing and electronically coupled to at least the microprocessor, wherein the non-transitory memory is configured to store the analog radar reflections, store the digital data; and store an operating system.

In another embodiment, a smart device may include a communication circuit disposed in the housing and electronically coupled to at least the microprocessor, wherein the communication circuit is configured to receive and transmit the digital data.

In another embodiment, a smart device may include a digital signal processor disposed inside the housing and electronically coupled to at least the microprocessor, the signal converter, and the non-transitory memory, wherein the digital signal processor is configured to identify the individual finger within the radar field, analyze any movement of the individual finger within the radar field using a Doppler method, convert the movement of the individual finger into gestures and writing symbols, and translate the writing symbols into words, numerals, or symbols.

In another embodiment, a smart device may include an operating system configured to display on a screen a plurality of document transactions for a document, translate one or more gestures by the user's one or more finger movements within a radar field selecting at least one document transaction, and process at least one document transaction.

In another embodiment, a smart device may be provided wherein the communication circuit is configured to communicate with a remote digital signal processor, and wherein the remote digital signal processor is configured to identify at least one object within the radar field, analyze any movement of the at least one object within the radar field using a Doppler method, convert the movement of the at least one object into gestures or writing symbols, and translate the writing symbols into words, numerals, or symbols.

In another embodiment, a smart device may be provided wherein the radar field is continuous while the radar transmitter is active.

In another embodiment, a smart device may be provided wherein the radar field has a depth between six inches and fifteen feet.

In another embodiment, a smart device may be provided wherein the radar field is pulsed.

In another embodiment, a smart device may be provided wherein the radar transmitter operates at a frequency between 3 GHz and 300 GHz.

In another embodiment, a smart device may be provided wherein the communication circuit further has a cellular antenna.

The smart device of claim 1 wherein the communication circuit further has a wi-fi antenna.

In another embodiment, a smart device may be provided with an encryption controller.

In another embodiment, a smart device may be provided wherein the non-transitory memory further has executable instructions and at least one datum configured to authenticate a user.

In one further embodiment, a method is provided for contact-minimized interactions with a smart device.

In another embodiment, a method is provided for sensing, at the smart device, one or more finger movements.

In another embodiment, a method is provided for identifying, at the smart device, a document associated with the one or more finger movements.

In another embodiment, a method is provided for activating, at the smart device, a Doppler millimeter-wave radar transmitter.

In another embodiment, a method is provided for transmitting, from the radar transmitter, a radar field.

In another embodiment, a method is provided for prompting, by the smart device, the user to write within the radar field an authentication passcode.

In another embodiment, a method is provided for receiving, at a radar receiver, Doppler radar reflections from at least one object within the radar field. The object within the radar field may be, for example, a user's hand.

In another embodiment, a method is provided for digitizing, at the smart device, the Doppler radar reflections.

In another embodiment, a method is provided for processing, at a digital signal processor ("DSP") at the smart device, the Doppler radar reflections.

In another embodiment, a method is provided for identifying, at the DSP, at least one target of a user's one or more fingers, wherein the at least one target is all or a portion of the at least one object.

In another embodiment, a method is provided for resolving and analyzing, at the DSP, movement of the at least one target.

In another embodiment, a method is provided for translating, at the DSP, the movement of the at least one target into gestures, words, numerals, or symbols.

In another embodiment, a method is provided for sending, from the smart device to an authentication server, the gestures, words, numerals, or symbols.

In another embodiment, a method is provided for authenticating the document, at the authentication server, by matching the gestures, words, numerals, or symbols to gestures, words, numerals, or symbols associated with an authentication passcode of the user.

In another embodiment, a method is provided for informing, by the authentication server, the smart device when the user has correctly provided the authentication passcode.

In another embodiment, a method is provided for displaying, at the smart device, a plurality of document transaction options for the document, in response to the user correctly providing the authentication passcode.

In another embodiment, a method is provided for selecting, at the smart device, at least one document transaction through at least one gesture in the radar field.

In another embodiment, a method is provided for processing, at the smart device, the at least one document transaction.

In another embodiment, a method is provided for employing, at the DSP, at least one machine learning algorithm to identify the at least one target, resolve the movement of the at least one target, and translate the movement into gestures, words, numerals, and symbols.

In another embodiment, a method is provided wherein the at least one object is a hand of the user.

In another embodiment, a method is provided wherein the at least one target is a finger on the hand of the user.

In another embodiment, a method is provided for sending, from the smart device, the digitized Doppler radar reflections to a remote digital signal processor ("DSP").

In another embodiment, a method is provided for processing, at the remote DSP, the Doppler radar reflections.

In another embodiment, a method is provided for identifying, at the remote DSP, at least one target of a finger, wherein the at least one target is all or a portion of at least one object, e.g., a hand.

In another embodiment, a method is provided for resolving and analyzing, at the remote DSP, movement of the at least one target.

In another embodiment, a method is provided for translating, at the remote DSP, the movement of the at least one target into gestures, words, numerals, or symbols.

In another embodiment, a method is provided for sending, from the remote DSP to an authentication server, the gestures, words, numerals, or symbols.

In another embodiment, a method is provided for authenticating the document, at the authentication server, by matching the gestures, words, numerals, or symbols to gestures, words, numerals, or symbols associated with the document.

In another embodiment, a method is provided for informing, by the authentication server, the smart device when the user has correctly provided an authentication passcode.

In another embodiment, a method is provided for displaying, at the smart device, a plurality of document transaction options for the document, in response to the user correctly providing the authentication passcode.

In another embodiment, a method is provided for selecting, at the smart device, at least one document transaction through at least one gesture in the radar field.

In another embodiment, a method is provided for processing, at the smart device, the at least one document transaction.

In another embodiment, a method is provided for employing, at the remote DSP, at least one machine learning algorithm to identify the at least one target, resolve the movement of the at least one target, translate the movement into gestures, words, numerals, and symbols.

In this application, it will be appreciated that the terms "smart device," "smart lens," and "smart lens device" may all be used interchangeably with each other. Further, the terms "lenses" and "one or more lenses" may be used interchangeably with each other. It will also be appreciated that the terms "gestures" and "movements" may be used interchangeably throughout the application.

Apparatus and methods for a contact-minimized (or contactless) smart lens device are provided. The contact-minimized smart lens device may utilize doppler-radar based gesture recognition and authentication.

The contact-minimized smart lens device may include a housing. In addition to typical smart lens device components (such as, e.g., a screen, keypad, microprocessor, non-transitory memory, encryption and authentication circuit, communication circuit), the housing may include a radar system with components including a radar transmitter, a radar receiver, analog-to-digital signal converter, and a DSP. The communication circuit may enable 5g cellular service. Each of these components may be electronically coupled to one or more of each other.

The contact-minimized smart lens device may also include apparatus to remotely sense and read finger movement, gesture, and expression.

The finger may be detected by radar, electromagnetic radiation waves, or by analyzing data contained in a magnetic stripe or a through a near-field communication ("NFC") chip worn on a finger. Alternatively, the smart lens device may sense and translate the finger gestures through any other appropriate methods, such as a wi-fi or Bluetooth signal.

In an embodiment, no physical document may be necessary. For example, a customer may open a banking application on a mobile phone to initiate a digital document transaction. If the customer is within range of a contact-minimized smart lens, a mobile phone application may take the place of a physical document. The data sent from the mobile phone application may include the necessary information so that the smart lens may conduct a document transaction without a physical document. This information may include, as non-limiting examples, document signatures, edits, corrections, and comments.

In an embodiment, the screen may be configured to display various document transaction options, such as input signature, edit, delete, comment, and other transactions. The screen may also display any other information necessary to complete a document transaction, such as instructions. The screen may also display any error codes and may preferably include options for navigating the smart lens via gestures or the standard keypad.

In an embodiment, the radar transmitter and radar receiver may be monostatic, i.e., they may use the same antennae, or their respective antennae may be adjacent to one another. In another embodiment, the radar transmitter and radar receiver may be quasi-monostatic, wherein the antennae are within approximately three feet of each other.

In an embodiment, the radar transmitter is a millimeter-wave radar transmitter. It may operate at a frequency between 3 gigahertz ("GHz") and 300 GHz. The radar transmitter may be configured to provide a pulsed or continuous radar field at a location in front of the housing. This location may begin within a few millimeters of the housing and extend as far as fifteen feet. The radar field may have a height, depth, and width. It may be preferable to have a radar field that begins one inch form the housing and extends to a depth of two feet. This smaller radar field may be more secure and may prevent attenuation/signal loss by environmental effects such as rain and moisture.

In an embodiment, the housing may include external walls and a roof surrounding and exceeding the radar field. These walls and roof may provide security to a customer as well as protect the smart lens device from environmental effects. For example, the smart lens device may be placed at one end of an enclosed room that is larger than the radar field.

In various embodiments, the radar transmitter may be a continuous-wave Doppler radar. The radar may operate on the "millimeter-band," i.e., between 30-300 GHz. At 30 GHz the radar's wavelength may be 10 mm, and at 300 GHz, the radar's wavelength may be 1 mm. Alternatively, the radar may operate between 3 and 30 GHZ, in the "microwave band." The smaller the wavelength the greater the resolution the radar may have. However, at a smaller wavelength the radar may detect extra erroneous objects and overwhelm the signal processor. It may be preferable to operate at a wavelength between 1 and 10 mm.

The radar transmitter may operate at a power up to 1000 W, although lower power outputs may be safer. The higher the power, the more range the radar may have. A preferred power level may depend on the preferred range.

In an embodiment the radar transmitter may have a range between 1 inch and 15feet.

In an embodiment, the radar transmitter may be a frequency-modulated continuous wave Doppler radar. Alternatively, the radar transmitter may be a pulse Doppler with a medium to high pulse repetition frequency ("PRF"). Alternatively, the radar transmitter may be able to operate in multiple modes, and a particular mode may be chosen by the smart lens device depending on environmental conditions or other factors.

In an embodiment, the DSP may be configured to identify and track the movement of human fingers or fingertips in the air. These movements may form gestures or writing. Alternatively, the DSP may be configured to also sense and track the movement of an object such as a stylus or a metallic pin.

The radar receiver may be configured to receive any radio waves reflected by an object such as a finger, a fingertip, a hand, multiple fingers, and/or a different object, and process the reflections using the digital signal processor. The radar receiver may be configured to receive reflections from any large-enough object within the radar field. Objects that are too small may not reflect the waves of the radar field. Generally, objects one-half the size of the radar frequency may be too small to reflect the radar waves. In an embodiment, the radar receiver may receive reflections from individual fingers belonging to a hand of a user of the smart lens device.

In an embodiment, the analog-to-digital signal converter may convert the received signals to digital data, and the DSP may perform various calculations on the digital data. Such calculations may include Doppler-effect calculations to determine the movement performed by the object. Other calculations may include range and velocity.

In an embodiment, the DSP may include a target identification module, a gesture sensing module, a gesture translation module, a user identification module, a user authentication module, and/or a transaction processing module. In another embodiment, one or more of the target identification module, gesture sensing module, gesture translation module, user identification module, user authentication module, and transaction processing module may be separate from the DSP.

In an embodiment, one or more of the target identification module, gesture sensing module, gesture translation module, user identification module, user authentication module, and transaction processing module may be referred to as a part of a feature extraction and translation engine. In an embodiment, the feature extraction and translation engine is another term for the DSP. In an embodiment, the feature extraction and translation engine is a part of the DSP.

In an embodiment, the DSP or feature extraction and translation engine may disregard objects with a size outside of a predetermined range. For example, the DSP or feature extraction and translation engine may disregard any objects with an area that is smaller than 1 mm^2 or larger than 5 cm^2.

In an embodiment, the DSP or one or more of the target identification module, gesture translation module, user identification module, and user authentication module may be located on a remote server. The smart lens device and/or its components may communicate with the remote server using wi-fi, LAN, WAN, internet connectivity, cellular networks, and/or 5G networks. Using 5G networks and communication protocols may enable faster processing of transaction and authentication requests.

In an embodiment, the gesture translation module may translate various gestures performed by a user to manipulate and use the smart lens device. Such gestures may include a pinch to change the screen size, a swipe left or right to change screens, a tap to select an object on the smart lens device screen, or other gestures. The smart lens device may display instructions to a user on how to perform gestures and which gestures perform particular actions. In an embodiment, a user is taught these gestures before using the smart lens device for a first time. For example, a user may be given instructions when opening an account at a financial institution.

In an embodiment, the gesture translation module, or another module, may translate gestures performed by a user as letters, words, numbers and symbols. Such gestures may be used to authenticate the user and may act as a written password or passcode.

The gesture translation module may utilize machine learning and deep-learning algorithms, such as, e.g., convolutional neural networks and random forest, to translate gestures into actions, letters, numbers, and/or symbols.

Such machine learning algorithms may be utilized at the time a user is interacting with a smart lens device. In an embodiment, a gesture translation module may have been trained with machine learning algorithms before a user has interacted with a smart lens device. This training may utilize sample data sets or prior data from the user.

In an embodiment, the gesture translation module, or another module, may be able to recognize a user's distinct handwriting and handwriting style. This recognition may be useful in authenticating the user.

In an embodiment, a user may perform a pre-determined gesture, or write a pre-determined phrase or word, to indicate authenticity of a proposed document transaction, or indicate that the user requires assistance. For example, a user may write "help" or "call 911" if the user requires assistance.

In an embodiment, the communication circuit may be configured to transmit and receive data including the digital data, gestures, words, numerals, and symbols. In alternative embodiments, the communication circuit may include a network interface card ("NIC"), a Bluetooth antenna, a cellular antenna, a wi-fi antenna, or any other appropriate antenna. A 5g-capable cellular antenna and communication circuit may be preferable to increase the speed of smart lens device transactions.

In an embodiment, the smart lens device may include an encryption controller. The encryption controller may allow for accurately authenticating the user/owner, as well as protecting the user/owner and financial institutions from users with malicious intent and/or fraud. In an embodiment, the non-transitory memory may include executable instructions and at least one datum configured to authenticate the user. These instructions and data may work in concert with, or separate from, any encryption controller.

Methods for processing document transactions using radar-based gesture recognition and authentication are provided.

A customer may process document transactions through a smart lens device without physically touching the document, or by minimizing the number of touches. The smart lens device may sense the customer's finger motion through radar sensing, visual sensing with a camera, a near-field communication ("NFC") circuit, magnetic sensing, or some other method.

In an embodiment, a user may activate the smart lens device through a mobile phone application instead of finger motion.

After the smart lens device senses the presence of a customer and the customer's finger (or mobile phone application), the smart lens device may enable a screen and display various options.

Before the customer may process any document transaction through the smart lens device, the customer may be authenticated. The smart lens device may prompt the customer to enter a passcode or PIN. At this time, and in an embodiment, after the ATM senses the presence of the customer's finger, the smart lens device may begin generating a Doppler continuous-wave radar field using radar components such as a transmitter, receiver, signal converter, and DSP.

In an embodiment, the radar field extends only for a few inches away from the smart lens device. In another embodiment, the radar field may extend as far as 15 feet away from the smart lens device. These ranges may be achieved by modulating the power output from the transmitter (i.e., less power equals less range).

In an embodiment, the passcode or PIN may be a particular gesture instead of a combination of numbers and letters. For example, a user may draw a shape in a particular manner (e.g., clockwise or counterclockwise, or right-handed vs. left-handed) and/or in a particular size. Every unique aspect of the gesture may be useful in authenticating the user.

To enter a passcode or PIN, the customer may write the passcode or PIN in the air, within the radar field, and without touching the smart lens device. The customer may use one or more fingers, a whole hand, or an object such as a stylus or pen.

As the radar field is being generated by a continuous-wave radio-frequency ("RF") signal (and in an embodiment, by a pulsed radio-frequency signal), any object within the field larger than one-half the wavelength of the RF signal should preferably reflect the RF signal back to a receiver. The signal converter may convert these reflections into digital data which may then be sent to the DSP and/or various modules such as, e.g., a gesture sensing module, gesture translation module, user identification module, user authentication module, and transaction processing module. These modules may be a part of or separate from the DSP. These modules may be referred to as a feature extraction and translation engine. In an embodiment, the DSP and the modules are a part of the smart lens device. In an alternative embodiment, the DSP and the modules are at a location remote from the smart lens device.

By analyzing the reflected data, the feature extraction and translation engine (in an embodiment, this may be referred to as the DSP) may identify discrete scattering centers, i.e., discrete objects reflecting RF waves within the radar field. In an embodiment, these discrete scattering centers may be separate fingertips (or whole fingers) on the user's hand. Alternatively, these discrete scattering centers may be a combination of one or more objects (such as a stylus) and fingers.

As the radar field is being generated by a RF signal, the movement of any discrete scattering centers within the field should preferably create a Doppler effect in the reflected RF signal. By analyzing the Doppler effect, the DSP/feature extraction and translation engine may track and record the movements of the object(s). Multiple objects may be tracked at any time, although tracking more objects may require more processing power. The movements of the object over time may be converted into a digital image (such as a heatmap, line, curve, or combination thereof). The digital image of the movements may be analyzed to identify a gesture or writing pattern, if any. This analysis may be performed using machine or deep-learning algorithms.

In an embodiment, the writing pattern may be mapped, using a machine learning algorithm, to a language, such as English, to determine if the customer wrote letters, numbers, and/or symbols, and to determine what letters, numbers, and/or symbols the customer wrote within the radar field. For example, when prompted to enter a password, the customer may write Password123! Within the radar field. In an alternative embodiment, instead of writing letters, numbers, and symbols, the customer may draw a unique image or gesture in the air in lieu of a password or PIN.

In an embodiment, the converting of the movements, identification of a writing pattern, and mapping to a language may be performed using deep neural machine learning or other algorithms. One or more of these steps may be performed locally at the smart lens device or the data may be transferred to a remote server with additional computing power.

In an embodiment, the results are sent to an external authentication server to authenticate the user/customer. In another embodiment, the authentication server may be a part of the DSP.

The authentication results may be sent back to the smart lens device. If the customer/user is authenticated, the smart lens device may continue with various transactions. If the user/customer is not authenticated, the smart lens device may block any transactions and may alert the customer, the financial institution, and/or the police, as necessary.

The digital data transfer (in both directions) may be sent over any suitable communications network, including 5G cellular networks.

In an embodiment, the unique way a customer writes or draws may be used to authenticate the user in lieu of, or in addition to, the password or PIN itself. For example, when opening a bank account, the financial institution may require the customer to write a password within a radar field for future authentication purposes. This initial interaction may be recorded and saved by the financial institution's authentication servers as part of the customer's profile.

After authentication/validation of the customer, the customer may use various gestures to perform any typical transaction with the smart lens device (such as document signing, endorsing, correcting, editing, commenting, etc.). A final gesture may terminate the transaction(s), or the transaction(s) may be terminated by the user withdrawing to a location that is beyond the range of the radar.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Smart lenses 304, 404, 605, 702, 802, and 1034 may have one or more features in common with the smart lens described herein. Additionally, features of smart lens described in connection with FIGS. 1-10 may be included in the smart lens described herein.

Figure 1:
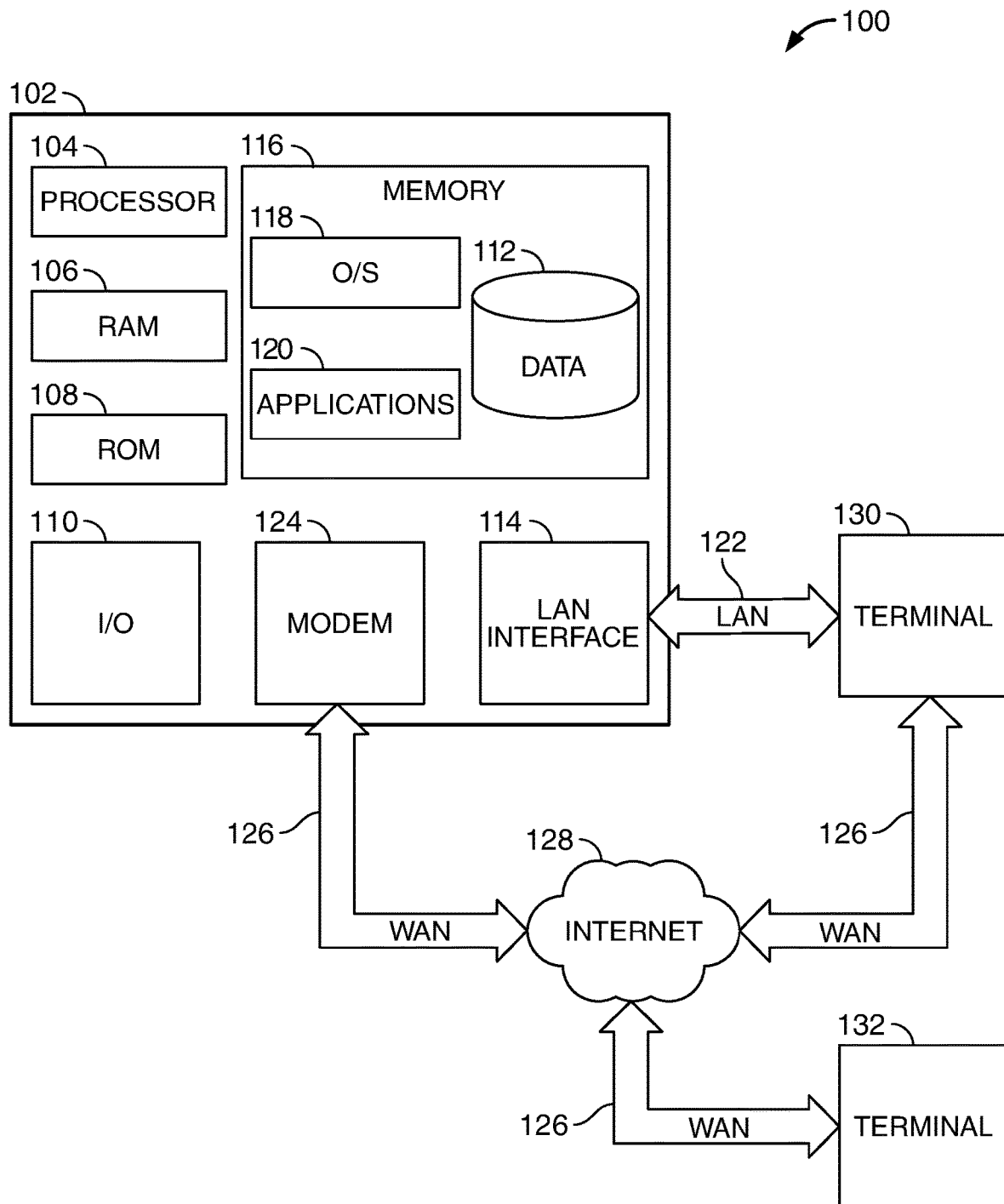
FIG. 1 shows an illustrative system in accordance with principles of the disclosure.

FIG. 1 shows an illustrative block diagram of system 100 that includes computer 101. One may refer to Computer 101 as an "engine," "server" or "computing device." Computer 101 may be a workstation, desktop, laptop, tablet, smart phone, or any other suitable computing device. One may use elements of system 100, including computer 101, to implement various aspects of the systems and methods disclosed herein.

Computer 101 may have processor 103 for controlling operation of the device and its associated components, and may include RAM 105, ROM 107, input/output module 109, and non-transitory/non-volatile machine-readable/writeable memory 115. One may configure machine-readable/writeable memory to store information in machine-readable/writeable data structures. Processor 103 may also execute all software running on the computer—e.g., an operating system and/or voice recognition software. Other components commonly used for computers, such as EEPROM or Flash memory or any other suitable components, may also be part of computer 101.

Memory 115 may be made up of any suitable permanent storage technology-e.g., a hard drive. Memory 115 may store software including operating system 117 and application program(s) 119 along with any data 111 needed for operation of system 100. Memory 115 may also store videos, text, and/or audio assistance files. One may store data in memory 115, in cache memory, or in any other suitable memory.

Input/output ("I/O") module 109 may include connectivity to a microphone, keyboard, touch screen, mouse, and/or stylus. One may provide input into computer 101 through these I/O modules. The input may include input relating to cursor movement. I/O 109 may also include one or more speakers for providing audio output and a video display device for providing textual, audio, audiovisual, and/or graphical output. The input and/or output may be related to computer application functionality.

One may connect System 100 to other systems via local area network (LAN) interface (or adapter) 113. System 100 may operate in a networked environment supporting connections to one or more remote computers, such as terminals 141 and 151. Terminals 141 and 151 may be personal computers or servers that include many or all the elements described above relative to system 100. Network connections depicted in FIG. 1 include a local area network (LAN) 125 and a wide area network (WAN) 129 but may also include other networks. One may connect computer 101 to LAN 125 through LAN interface (or adapter) 113 when using a LAN networking environment. When used in a WAN networking environment, computer 101 may include modem 127 or other means for establishing communications over WAN 129, such as Internet 131.

One appreciates that the network connections shown are illustrative. One may use other means of establishing a communications link between computers. One may presume the existence of various well-known protocols such as TCP/IP, Ethernet, FTP, HTTP, and the like. One may operate the system in a client-server configuration to permit retrieval of data from a web-based server or application programming interface (API). One may understand that web-based, for this application, includes a cloud-based system. The web-based server may transmit data to any other suitable computer system. The web-based server may also send computer-readable instructions, together with data, to any suitable computer system. The computer-readable instructions may be to store data in cache memory, the hard drive, secondary memory, or any other suitable memory.

Additionally, one may use application program(s) 119 on computer 101. These programs may include computer executable instructions for invoking functionality related to communication, such as e-mail, Short Message Service (SMS), and voice input and speech recognition applications. One may refer to application program(s) 119 (alternatively, "plugins," "applications," or "apps") to include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for the processing of calls received from calling sources as detailed herein.

Application program(s) 119 may include computer executable instructions (alternatively referred to as "programs"). Embodied in hardware or firmware (not shown) may be the computer executable instructions. Computer 101 may execute the instructions embodied by the application program(s) 119 to perform various functions.

Application program(s) 119 may utilize the computer-executable instructions executed by a processor. Programs include routines, programs, objects, components, data structures, etc. that perform tasks or implement abstract data types. A computing system may be operational with distributed computing environments. Remote processing may perform tasks on devices linked through a communications network. In a distributed computing environment, a program may be in both local and remote computer storage media including memory storage devices. Computing systems may rely on a network of remote servers hosted on the Internet to store, manage, and process data (e.g., "cloud computing" and/or "fog computing").

Stored in memory 115 is any information described above in connection with database 111, and any other suitable information. One or more of application program(s) 119 may include one or more algorithms used to add data and metadata to a database, identify a type of form being used, predict fields in a document, identify changes between documents, provide changes to an entity to ascertain if an error is present, identify fraud concerns, communicate fraud concerns to interested parties within an organization, and provide documents for providing to a regulatory authority.

One may describe the invention in the context of computer-executable instructions, such as application program (s) 119, for execution by a computer. Programs may include routines, programs, objects, components, and data structures, which perform tasks or implement data types. One may practice the invention in distributed computing environments. One may perform tasks by remote processing devices, linked through a communications network. In a distributed computing environment, programs may be in both local and remote computer storage media including memory storage devices. One may consider such programs, for this application's purposes, as engines for the performance of the program-assigned tasks.

Computer 101 and/or terminals 141 and 151 may also include various other components, such as a battery, speaker, and/or antennas (not shown). One may link components of computer system 101 by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
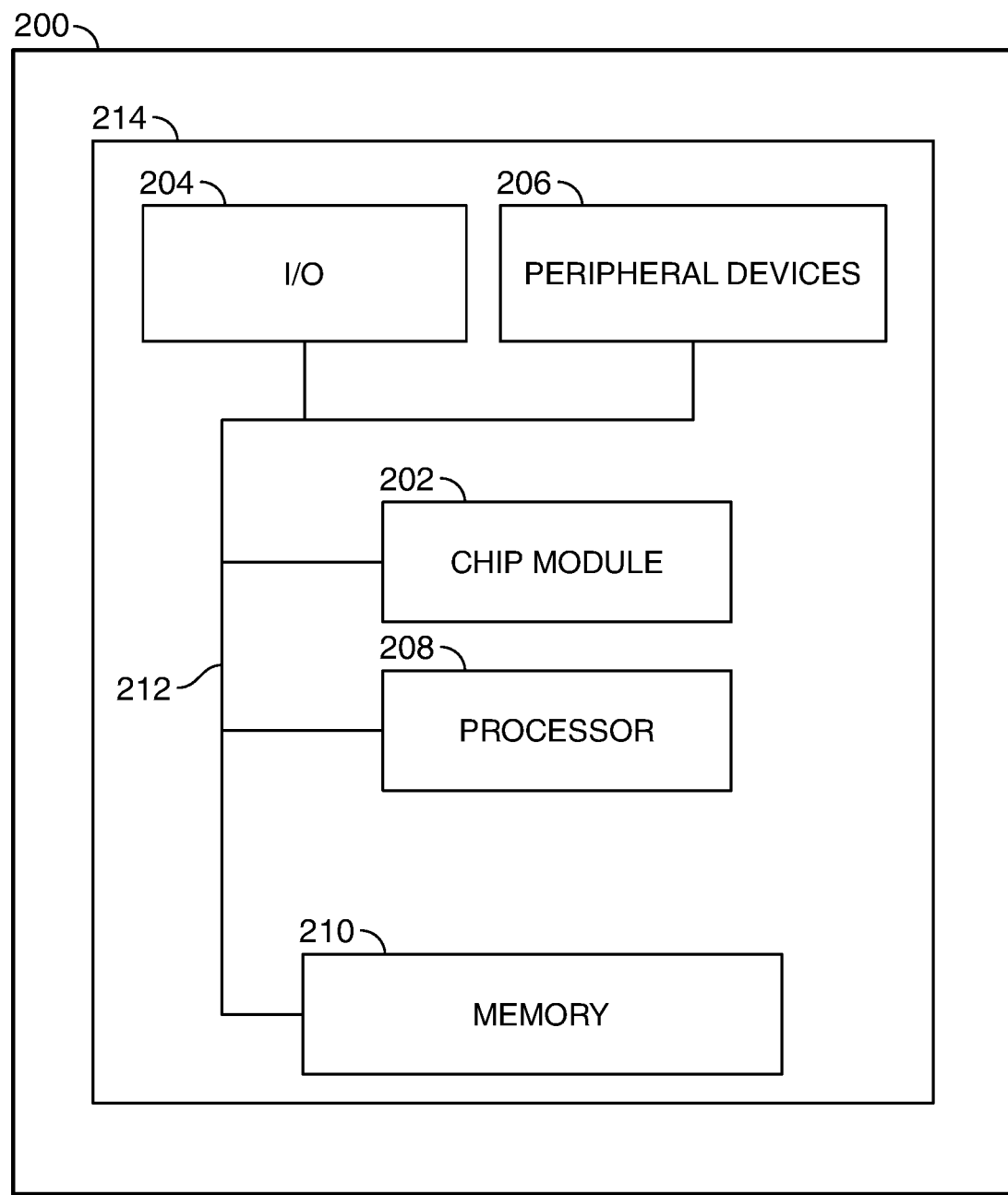
FIG. 2 shows an exemplary diagram in accordance with principles of the disclosure.

FIG. 2 shows an illustrative block diagram of apparatus 200. One may configure apparatus 200 in accordance with the principles of the disclosure. Apparatus 200 may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real time timers, power-on reset generators or any other suitable peripheral devices; logical processing device 208, which may compute data structural information and structural parameters of data; and machine-readable/writeable memory 210.

One may configure machine-readable/writeable memory 210 to store information in machine-readable/writeable data structures, such as: machine executable instructions (for example, "computer instructions" or "computer code"); applications, signals; and/or any other suitable information or data structures.

One may couple together components 202, 204, 206, 208 and 210 by system bus (or other interconnections) 212 and may be present on one or more than one circuit board 220. In some embodiments, the components may be integrated into a single chip. The chip may be silicon-based.

Figure 3:
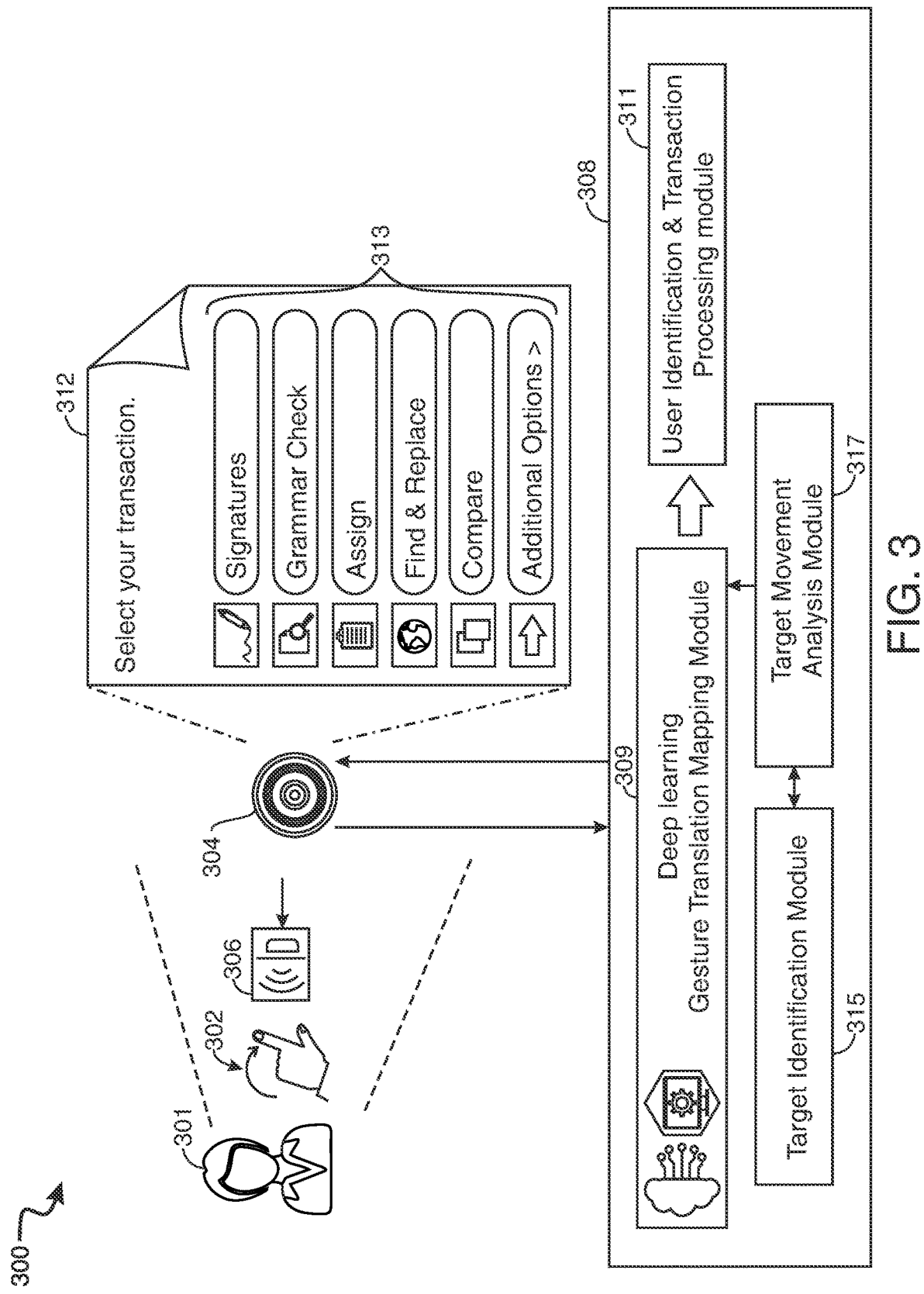
FIG. 3 shows an illustrative diagram in accordance with principles of the disclosure.

FIG. 3 shows an illustrative process schematic of a method for contact-minimized smart lens device use and transaction processing using Doppler-radar based gesture recognition and authentication, in accordance with the principles of the disclosure. FIG. 3 contains both illustrative steps and numbered components.

Contact-minimized smart lens device 304 use and transaction processing method 300 may include generating a radar field 306. A user may write 302 an illustrative passcode within the radar field 306. The radar reflections, such as the illustrative passcode, may be analyzed by a DSP (not shown) which includes a machine or deep-learning gesture translation and mapping module 309. The gesture translation mapping module 309 may recognize the writing 302 in the air. In addition, translation mapping module 309 may recognize a customer's distinctive writing 302 style and quirks. Distinctive writing 302 style and quirks may be associated with a particular user as part of an authentication protocol.

After the gesture translation and mapping module 309 analyzes the writing 302, the data generated (including distinctive style, gestures, numbers, letters, and/or symbols) may be sent to a user identification and transaction processing module 311. If the data generated matches the data associated with the user, the user may be authenticated, and may continue to use the smart lens device. If the user is not authenticated, any attempted transaction with the smart lens device may be rejected.

Select transactions 312 may be chosen from a smart lens device display. Specific document transactions 313, including but not limited to, signatures, grammar check, assign, find & replace, compare, and additional options are shown.

Figure 4:
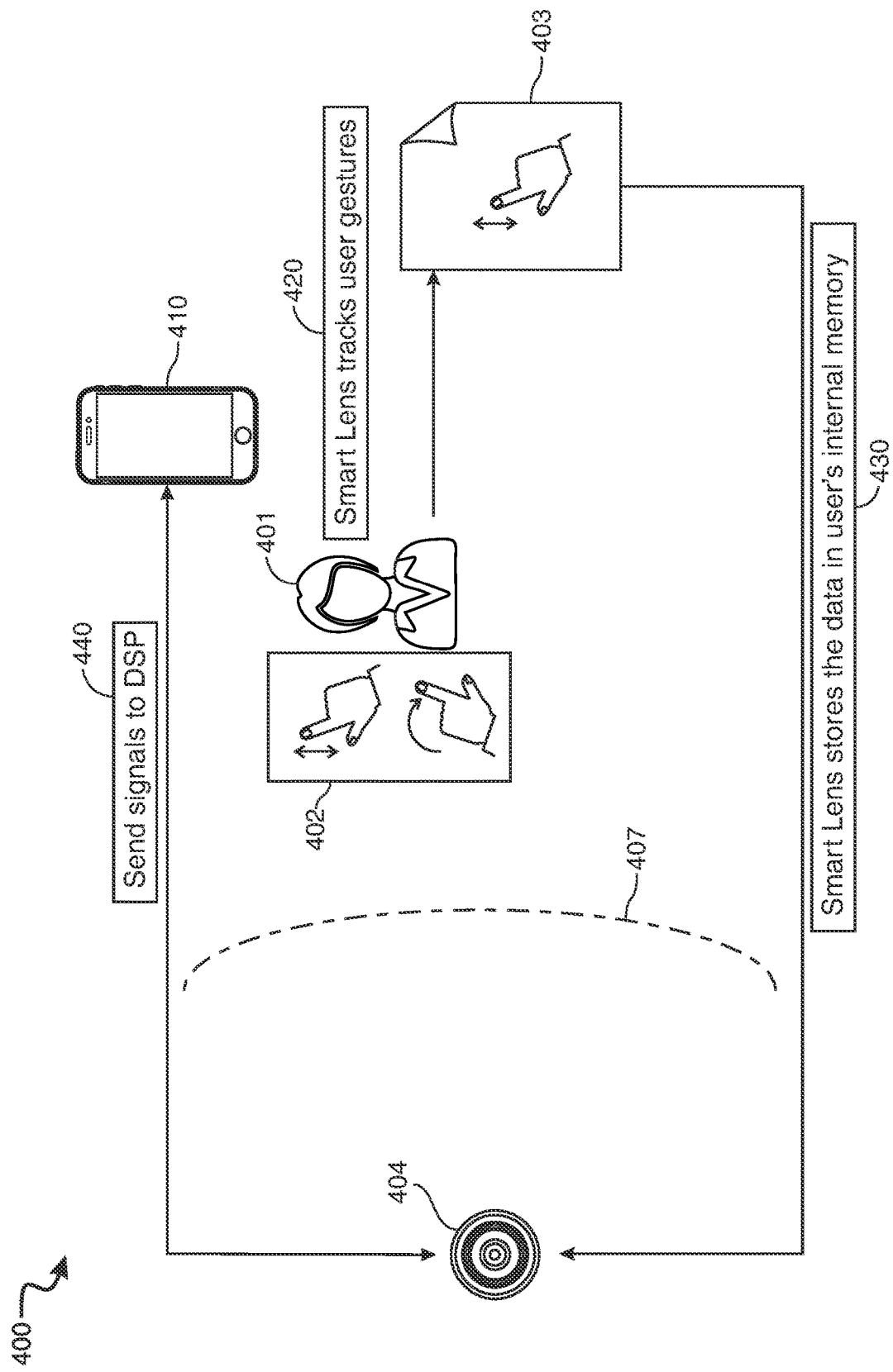
FIG. 4 shows illustrative systems and methods in accordance with principles of the disclosure.

FIG. 4 shows an illustrative embodiment 400 of an object within a radar field, in accordance with the principles of the disclosure.

Radar field 407 may interact with mobile phone 410 and smart lens device 404. Illustrative hands 402 and 403 of user 401 may be within the radar field 407. A smart lens tracks user finger gestures 420. Hand 402 may be an object within the radar field 407 and may also include a subset of further fingers as portions of the hand 402. Signals 440 from the radar field 407 may be sent to a DSP located within a smartphone 410. A DSP may analyze the signals and identify finger gestures. The smart lens device then stores the data in the user's internal memory, either on the smart lens device 404, a mobile phone 410, and/or other device. In this illustrative image, the finger gestures may be from individual fingers of hand 402 and/or hand 403.

In an embodiment, a DSP may analyze multiple hands 402 and 403 to identify finger motion and track and analyze the movement of fingers over time by mapping the radar reflections 407 using a Doppler or other method. The DSP may then translate and map the movement into gestures, words, letters, numbers, and/or symbols.

In an embodiment, the DSP, a different module, or server may associate the gestures, words, letters, numbers, and/or symbols with a particular customer to authenticate the customer. In addition, the DSP, a different module, or server may associate the gestures, words, letters, numbers, and/or symbols with a particular transaction the customer may choose to perform at the smart lens device.

Figure 5:
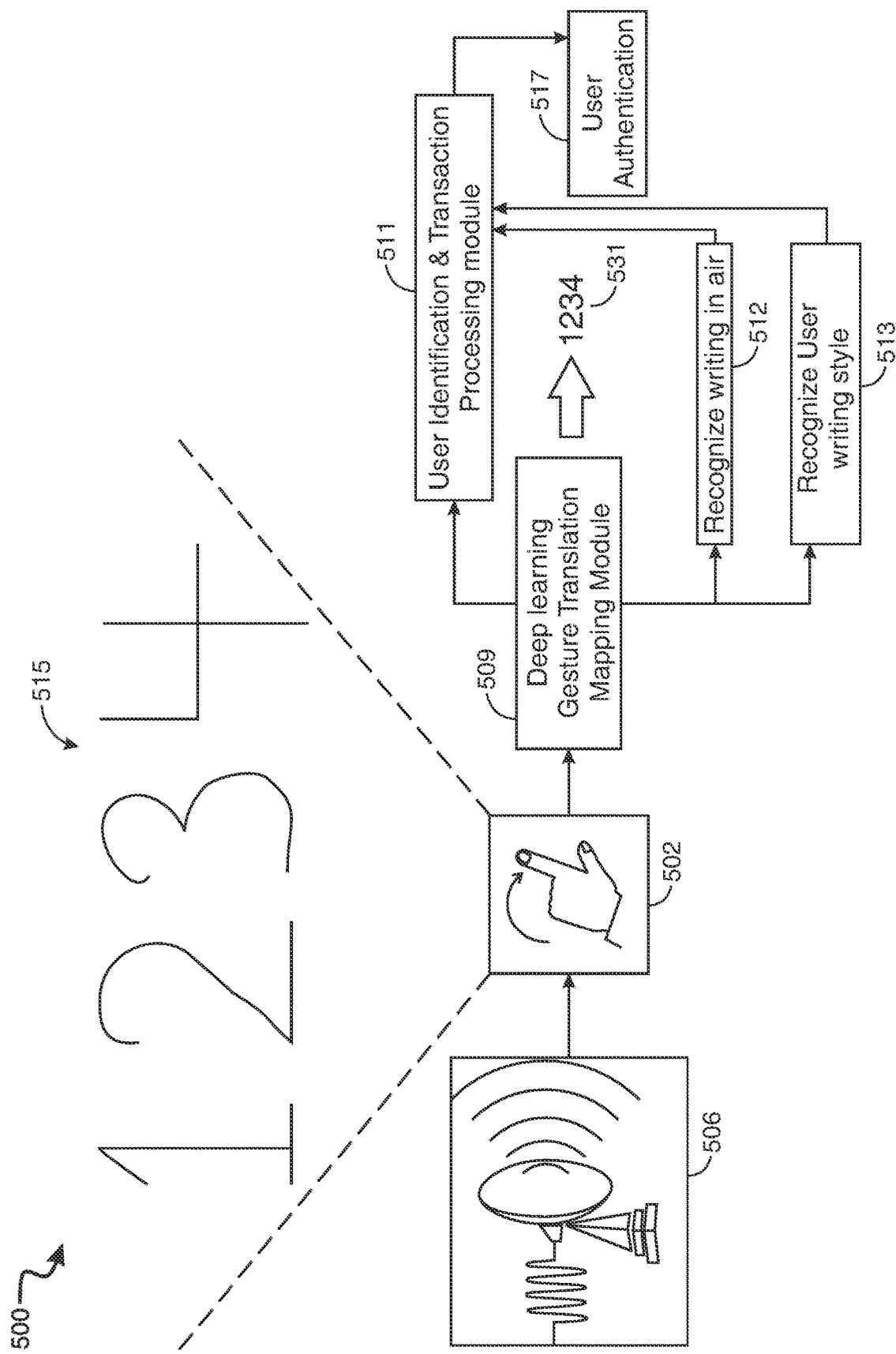
FIG. 5 shows illustrative systems and methods in accordance with principles of the disclosure.

FIG. 5 shows an illustrative method in accordance with the principles of the disclosure. Methods may include some or all of the method steps 502-531. Methods may include the steps illustrated in FIG. 5 in an order different from the illustrated order. The illustrative method shown in FIG. 5 may include one or more steps performed in FIGS. 1-3, or described herein.

At step 500, a DSP or feature extraction and translation engine may identify one or more target(s) or finger(s) 502 from a plurality of objects that have reflected radio waves within a radar field 506. At step 515, using Doppler methods and calculations, a finger 502 may write gestures in the air that are picked up by a radar detector in a smart lens device.

At step 512, the DSP may resolve the movement of the target(s) and at step 515, the DSP may recognize the writing in the air 512, the DSP may recognize the user's writing style 513, and the DSP may track the movement. Steps 509, 512, and 513 may allow the DSP to convert the movement into a pattern to identify writing at step 515. The writing 531 may include gestures, letters, numbers, and/or symbols.

At step 509, the DSP may use machine and deep-learning algorithms to map the converted movement to a particular language to determine what was written. At this point, what was written within the radar field may be an authentication passcode or directions. In an embodiment, the mapped movement to language may be sent to a user authentication server 517 for authenticating the customer. The mapped movement to language may also be sent to the smart lens device or other server to direct one or more smart lens device transactions. In an embodiment, language includes gestures such as pinching to zoom in or out, pressing to select an option, swiping to move screens or other gestures.

Figure 6:
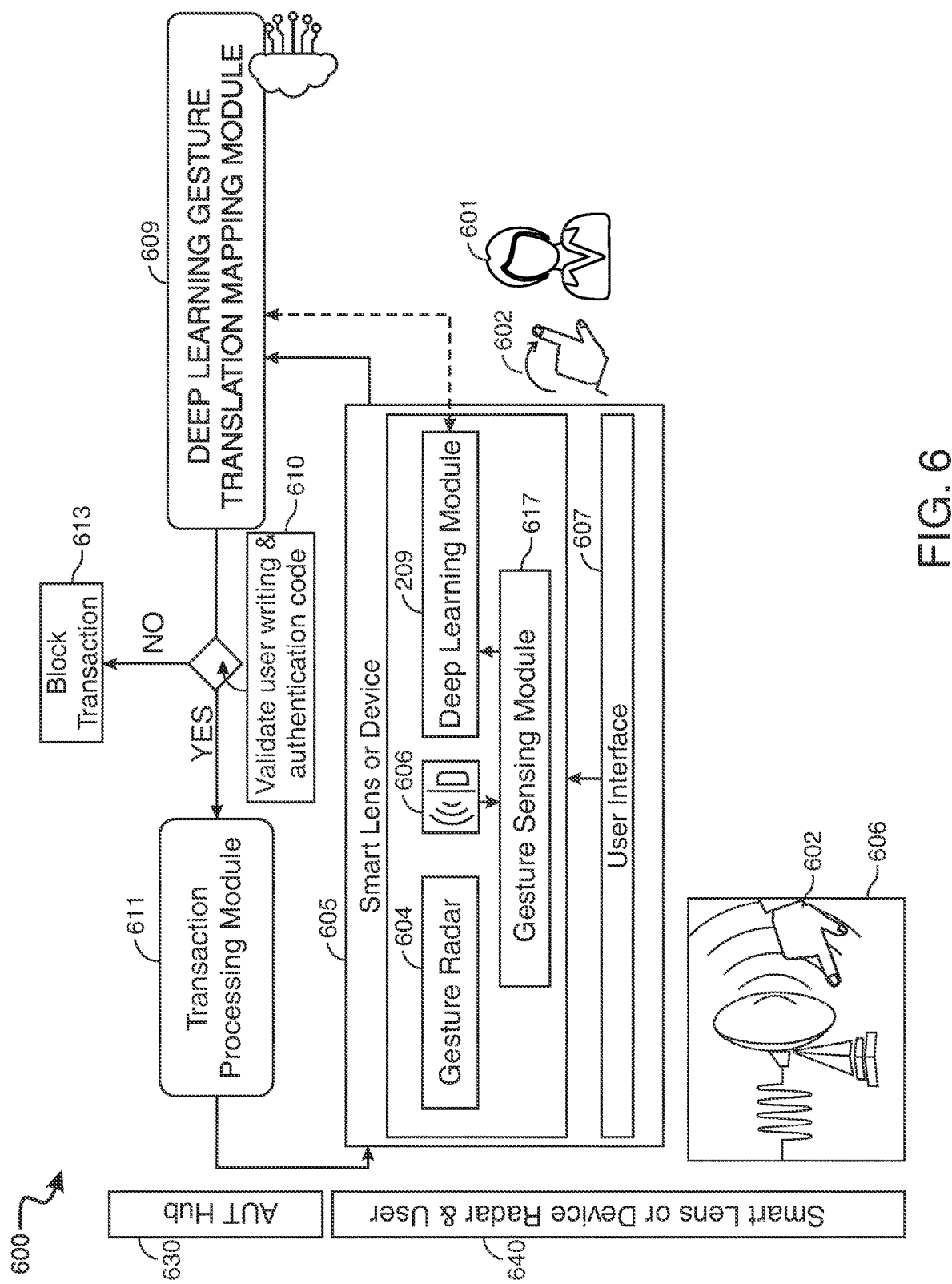
FIG. 6 shows illustrative systems and methods in accordance with principles of the disclosure.

FIG. 6 shows an illustrative process schematic of a method for contact-minimized smart lens device use and transaction processing using Doppler-radar based gesture recognition and authentication, in accordance with the principles of the disclosure. FIG. 6 contains both illustrative steps and numbered components.

Contact-minimized smart lens device use and transaction processing method 600 may include an authorization hub 630 and a smart lens device radar and user 601. Authorization hub 630 may include a transaction processing module 611, a deep learning gesture translation mapping module 609, other modules, and process steps. Smart lens device radar and user 640 may include a user 601, a radar field 606, a smart lens device 605, a target moving analysis/gesture sensing module 617, and user finger gestures/movements 602, among other components and process steps. Authorization hub 630 and smart lens device radar and user 601 may communicate with each other using a communication circuit (not shown), using any suitable communication method, including 5g cellular communications.

Method 600 may include a customer/user 601 waving a finger 602 in front of a smart lens or device 605 to initiate a transaction. In alternative embodiments, the finger may utilize an NFC chip instead of physically moving. Alternatively, no finger may be necessary, and a user may instead initiate a transaction though a different method, such as through a mobile phone application.

After initiating a transaction, the smart lens device 605 may activate a gesture radar 604 which may transmit a radar field 606. The smart lens device 605 may prompt the customer 601 to enter an authentication passcode. The customer 601 may then perform one or movements 602 in the radar field 606, such as writing a passcode.

A target movement analysis module/gesture sensing module 617 may analyze the movement(s) 602 to identify targets to track. The tracked movements 602 may then be communicated with a machine and deep learning gesture translation mapping module 609 to determine what, if anything, the customer 601 wrote with movement(s) 602. In alternative embodiments, the deep learning gesture translation mapping module 609 may be a part of smart lens device 605 or it may be remote from the smart lens device 605. The deep learning gesture translation mapping module 609 may be a part of a DSP and it may be a part of feature extraction and translation engine.

At step 610, the translated movement(s) 602 may be used to validate and authenticate the customer 601. For example, if the customer 601 wrote with movement(s) 602 a correct passcode, a transaction processing module 611 may be activated. If the customer 601 did not write a correct passcode, any attempted transaction may be blocked 613. Passcodes may be gestures, numbers, letters, symbols, shapes, a specific style of movement(s) 602, or a combination thereof.

FIG. 7 shows an illustrative system in accordance with the invention. In FIG. 7, a smart lens user is shown wearing smart lens 702. Smart lens 702 is shown executing a finger movement tracking module 704, a data capture module 708, a data entry orchestration engine 710 and a Lifi data transfer engine 714 for copying data from a first UI 716 to a second UI 718.

Each of 704, 708, 710 and 714 may be executed on smart lens 702. In some embodiments, each of 704, 708, 710 and 714 may be executed on a remote server. Deep learning neural net 706 and intelligent bulk data entry engine 712 may be executed on smart lens 702 or on a remote server.

The smart lens device and the remote server may have one or more computer systems and servers that include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory. The source database may be part of a computer system. The target database may be part of a computer system. It should be appreciated that when run on the smart lens, each hardware may be a micro version. Processors, receivers, transmitters, sensors and cameras and any other suitable hardware may be micro.

The smart lens and the remote server may include RAM, ROM, an input/output ("I/O") module and a non-transitory or non-volatile memory. Machine-readable memory may store information in machine-readable data structures. The I/O module may include a microphone, button and/or touch screen which may accept user-provided input. The I/O module may include a speaker for providing audio output and/or a video display for providing textual, audio, and/or graphical output.

Software applications executed by the smart lens and the remote server may be stored within the non-transitory memory and/or other storage medium. Software applications may provide instructions to the processor that enable the apparatus to perform various functions. The instructions may include any of the smart lens methods and processes described herein. For example, the non-transitory memory may store software applications such as the finger movement tracking module and data capture module. Alternatively, some or all of computer executable instructions of a software application may be embodied in hardware or firmware components of a computer system or server.

Software applications may include computer executable instructions for invoking user functionality related to communication, such as email, short message service ("SMS"), and voice input and speech recognition applications. Software application programs may utilize one or more algorithms that process received executable instructions, perform power management routines or other suitable tasks.

Software applications may utilize computer-executable instructions, such as program modules, executed by a processor. Generally, program modules include routines, programs, objects, components, data structures, etc. that perform particular tasks or implement particular abstract data types. A computing system may be operational with distributed computing environments where tasks are performed by remote processing devices that are linked through a communications network. In a distributed computing environment, program modules may be located in both local and remote computer storage media including memory storage devices. Computing systems may rely on a network of remote servers hosted on the Internet to store, manage, and process data (e.g., "cloud computing" and/or "fog computing").

The smart lens and the remote server may be part of two or more networks. The smart lens and the remote server may support establishing network connections to one or more remote computing systems. Illustrative network connections may include a local area network ("LAN") and a wide area network ("WAN"). When used in a LAN networking environment, a computing system may be connected to the LAN through a network interface or adapter. A computing system may include a communication circuit. The communication circuit may include a network interface card or adapter.

When used in a WAN networking environment, the smart lens and the remote server may include a modem, antenna, or other circuitry for establishing communications over a WAN, such as the Internet. The communication circuit may include a modem and/or antenna.

The existence of any of various well-known protocols such as TCP/IP, Ethernet, FTP, HTTP and the like is presumed, and a computing system may be operated in a client-server configuration to permit a user to retrieve web pages from a web-based server. Web browsers can be used to display and manipulate data on web pages.

Computer systems and servers may include components, such as a display, battery, speaker, and antennas. Components of a computer system and server may be linked by a system bus, wirelessly or by other suitable interconnections. Components of a computer system and server may be present on one or more circuit boards.

The system may include a first terminal 716. The first terminal may be a computing device. The first terminal 716 may include a first UI. The first UI may display data entry field identifiers and data entry fields. The first terminal 716 may be Lifi enabled and may include a Lifi receptor.

The system may include a second terminal 718. The second terminal may be a computing device. The second terminal 718 may include a second UI. The second UI may display data entry field identifiers and data entry fields. The second terminal 718 may also be Lifi enabled and may include a Lifi receptor.

It should be appreciated that first terminal 716 and second terminal 718 may be within a finger field of interest of smart lens 702.

Smart lens 702 may enable copying data from one computing device to another computing device.

Smart lens 702 may execute the finger movement tracking module 104 to track the movement of the user's finger of smart lens 702. The finger movement tracking module 104 may implement deep learning with convolutional neural networks ("CNNs") to enable finger tracking.

At 704, finger movement tracking module may track the movement of the user's fingers. The user may be looking at the first UI at 716. Once the user identifies the document transaction that the user will be using, the finger movement tracking module may detect a movement of the user's fingers while updating a data entry field. Using any suitable finger tracker application, the finger movement tracking module may identify a segment of data corresponding to the user's finger movement.

At 708, the data capture module may capture the data segment identified by the finger movement tracking module. The capturing may be performed by the micro camera on the smart lens. The captured data may then be stored in memory on the smart lens.

The system may include a data orchestration engine 710. Data entry orchestration engine 110 may be used to manage and track operations relating to the data entry at each terminal. Data entry orchestration engine 710 may ensure that the user's finger movement position and tracking is in synchronization with the data segment captured. Additionally, it may ensure that the data segment captured is appropriately transferred to the second terminal. Each data entry activity and the sequence may be tracked by the data entry orchestration engine.

Data orchestration engine 710 may use deep learning and tiny machine learning ("ML"). Deep learning and Tiny ML may refer to machine learning processes that can be performed on the microprocessor without surpassing the microprocessor's processing capacities. Exemplary algorithms for deep learning and ML are CNNs, generative adversarial network ("GAN") and long short-term memory ("LSTM"). The CNNs may ensure stable finger tracking. The GAN may be used to classify fields at each UI and capture a contextual understanding. The LSTM may be used to understand the sequence of the data entry from the first UI to the second, third, fourth and/or Nth UI.

The data orchestration engine 710 may also include an intelligent bulk data entry engine 712.

Intelligent bulk data entry engine 712 may work in synchronization with the data entry orchestration engine 710. The intelligent bulk data entry engine 712 may enable an understanding of the data entry fields that may be populated and/or filled at the UI. Over time, the system may understand the data entry pattern using deep learning. Based on the understanding, system may be enabled to, over time, enable a user to look at a first UI and transmit the data from the first UI to the second UI automatically.

The Intelligent bulk data entry engine 712 may be a software application that may execute a prediction algorithm based on historical data captured at a first UI and transferred to one or more second UIs and may develop a prediction algorithm of data transfer between the first UI and the one or more second UIs.

For example, the first UI may display a base home mortgage loan application. The prediction model may determine, based on past historical use data of the smart lens, that a User ID and a social security number displayed in the base home mortgage loan application is always copied, by the user, into a plurality of application forms displayed on a plurality of second UI's. Thus, at a later point in time, when the first UI is captured by the smart lens, the intelligent bulk data entry engine 712 may automatically transmit a User ID and social security number displayed in the first UI into the plurality of second UIs without the user's fingers moving on each UI.

The prediction algorithm and a set of training data may be stored in the memory of the smart lens. The training data may be data used to train the prediction algorithm. The training may include feeding the training data to a generic algorithm to compute the prediction algorithm. The training data may be historical data of prior-executed transfers of data from one or more first UIs to one or more second UI's. The historical data may list data entry fields and associated data entry field identifiers which were used to transfer data to specific UI's.

The intelligent bulk data entry engine 112 may execute bulk entry operations from one UI to another one or more second UIs. The intelligent bulk data entry engine 712 may execute the prediction algorithm and identify pages within an application that require a copy and paste of each data entry field on the page. When the page is displayed on the UI that the user's finger is moving on, the prediction algorithm may enable the intelligent bulk data entry engine 712 to automatically capture all the data entry fields on the page, store them on the smart lens memory and transmit, through the LED of the smart lens, each data entry field to the corresponding data entry fields at the second UI.

In some embodiments, the user may wish to override the prediction algorithm. The system may recognize specific finger gestures that may infer that an automatic capturing and transmitting may be cancelled and not be performed at this instance. For example, the system may detect three deliberate finger gestures one after another. This may initiate a cancelling of the automatic capturing and may enable the user to perform a single deliberate finger gesture at the data entry field of interest. In another example, a prolonged single deliberate finger gesture may infer an override. The prolonged single deliberate finger gesture may include a movement of a finger for a length of time greater than the length of time for a deliberate finger movement.

Lifi data transfer engine 714 may keep track of the way the data segment is captured to enable transmitting the data in the same form it was captured to the appropriate location on the second UI 718. The data segment may be transmitted using the LED at the smart lens to a Lifi receptor at the second terminal 718.

It should be appreciated that the data may be captured from the first UI 716 and transmitted to the second UI 718. The data may also be captured from the second UI 718 and then transmitted to the first UI 716.

FIG. 8 shows an exemplary diagram 800 of the initial pairing of the smart lens to the devices.

When smart lens 802 is activated to begin capturing data from a first UI at a first terminal 804 to a second UI at a second terminal 806, prior to activation, the terminals may be paired with the smart lens. The pairing may be enabled by a token, as shown at 808. The token may authenticate the smart lens. The token may be a password stored at the smart lens and transmitted by LED to the first and second terminals. The terminals may authenticate the password and initiate the pairing of the devices.

In some embodiments, the user may manually input the password at each of the first UI and the second UI. The terminal may receive the password and may be configured to authenticate the user by the password. The terminal may combine biometric data from the user's finger and the transmitted password and compare it to stored data associated with the user stored at the terminal.

Additionally, the smart lens may verify the user of the smart lens before activating the finger tracking module. The smart lens may include an authentication application. User authentication may be based on one or more biometric factors, behavioral factors, touch or air gestures, or any suitable method or combination of methods. Illustrative biometric factors include fingerprint, voiceprint, and iris recognition. Illustrative behavioral features include gait, head movements, and body movements.

Fingerprint recognition may automatically enable the user of the smart lens to be authenticated. The system may be enabled to automatically recognize the fingerprint without the need for another device.

FIG. 9 shows an illustrative diagram 900 in accordance with principles of the disclosure. The illustrative diagram 900 shows data segments from data entry fields at UI screen 902 captured and transmitted using Lifi to data entry fields at UI screen 904.

UI screen 902 may display data associated with a document. A grammar check may be displayed at 926. "GRAMMAR CHECK" may be the data entry field identifier. "0000001" may be the value of the data entry field associated with the "GRAMMAR CHECK." Each value within each data entry field of the first UI 902 may need to be copied and pasted into UI screen 2 shown at 904.

In some embodiments, each data entry field may be captured by the user's finger, as shown at 912. Each captured data entry field may be stored at the smart lens, as shown at 914. Each captured data entry field may then be transmitted to the second terminal 904.

The user may direct the point of movement to the data entry field in accordance with principles of the disclosure. For example, data entry field 906 may display "ASSIGN" a document. The data segment captured may be "ABC." The user may direct the point of movement at 906. The user may initiate a first gesture at the start point "A," a second gesture at the second point "B," and a third gesture at the last letter "C" of 306. The complete data segment "ABC" may be captured.

Following the capturing, the data segment "ABC" and the data entry field identifier "ASSIGN" may be stored at the smart lens. When the user's point of movement is detected at the second UI, the stored data segment may be transmitted to the second UI and inputted at the point of movement, as shown at 928.

Data segment 924 may be captured, stored and then inputted at 918 on the second UI. And data segment 908 may be captured, stored, and then input at 920 on the second UI. Further, data segment 926 may be captured, stored, and then input at 916 on the second UI. Finally, data segment 910 may be captured, stored, and then input at 922 on the second UI.

In another embodiment, the system may be configured to identify, based on machine learning, that UI 902 may display data associated with a document. The system may recognize that each data entry field may need to be captured. The system may be configured to perform a bulk capturing on the first UI. The system may capture each data entry field on the first UI screen 902, store the data, and then input each data entry field into the second UI. The bulk capturing may be automated and may be performed without capturing a point of movement of the user's finger.

FIG. 10 shows systems and methods 1000 in accordance with principles of the disclosure. FIG. 4 may display the systems and methods for capturing data from one terminal and pasting the data into a second terminal. It should be appreciated that the data may be captured from UI at terminal 1014 and pasted into UI at terminal 1016. The data may be captured, vice versa, from UI at terminal 1016 and pasted into UI at terminal 1014.

Terminal 1014 and terminal 1016 may include Lifi capabilities. Smart lens 1034 may also include Lifi, using an LED embedded on the smart lens 1034.

At 1002, finger movement tracking module may track the movement of the user's finger. The point of movement may be directed at UI 1014. The point of movement may be directed at UI 1016. Data capture module 1004 may capture the segment of data from the point of movement. Data entry orchestration engine 1006 may be configured to, in combination with intelligent bulk data entry engine 1012, ensure that the user's finger movement position and tracking is in synchronization with the data segment captured. Additionally, data entry orchestration engine 1006 may ensure that the data segment captured is appropriately transferred to the other terminal. Each data entry activity and the sequence may be tracked by the data entry orchestration engine and intelligent bulk data entry engine.

The data segment may be stored in memory as shown at 1008 and 1010 of the smart lens 1034. Memory may include data segments captured from application 1 at UI 1018. Memory may include data segments captured from application 2 at UI 1020. The data segments stored may be transmitted to the correlating data entry field within either one of UI 1018 or UI 1020 or both UI 1018 and UI 1020.

Thus, methods and apparatus for transferring data from a first UI to a second UI using a smart lens is provided. Persons skilled in the art will appreciate that the present invention can be practiced by other than the described embodiments, which are presented for purposes of illustration rather than of limitation, and that the present invention is limited only by the claims that follow.

What is claimed is:

1. A smart device comprising:
a housing;
a microprocessor disposed in the housing;
a reader disposed in the housing and electronically coupled to at least the microprocessor, configured to read finger movements;
a screen disposed in the housing and electronically coupled to at least the microprocessor, configured to display document transaction options;
a millimeter-wave radar transmitter disposed in the housing and electronically coupled to at least the microprocessor, wherein the radar transmitter is configured to provide a radar field in front of the housing with a height, depth, and width;
a radar receiver disposed in the housing and electronically coupled to at least the microprocessor, wherein the radar receiver is configured to receive radar reflections from at least one object within the radar field, wherein the at least one object is an individual finger of a hand belonging to a user;
an analog-to-digital signal converter disposed in the housing and electronically coupled to at least the microprocessor and the radar receiver, wherein the signal converter is configured to convert analog radar reflections to digital data;
non-transitory memory disposed in the housing and electronically coupled to at least the microprocessor, wherein the non-transitory memory is configured to:
store the analog radar reflections;
store the digital data; and
store an operating system;
a communication circuit disposed in the housing and electronically coupled to at least the microprocessor, wherein the communication circuit is configured to receive and transmit the digital data; and
a digital signal processor disposed inside the housing and electronically coupled to at least the microprocessor, the signal converter, and the non-transitory memory, wherein the digital signal processor is configured to:
identify the individual finger within the radar field;
analyze any movement of the individual finger within the radar field using a Doppler method;
convert the movement of the individual finger into gestures and writing symbols, the gestures including a double deliberate finger gesture when any of the digital data is inaccurate, a triple deliberate finger gesture to cancel contact-minimized interaction with the smart device, and a prolonged single deliberate gesture to override the contact-minimized interaction with the smart device thereby enabling the user to manually enter data into a data entry field; and
translate the writing symbols into words, numerals, or symbols; and wherein the operating system is configured to:
display on the screen a plurality of document transactions for one or more documents;
translate one or more finger gestures within the radar field selecting at least one document transaction;
delete any inaccurate digital data in the one or more documents;
make one or more corrections to the one or more documents;
store the one or more documents on the non-transitory memory;
use an intelligent bulk data entry engine in synchronization with a data entry orchestration engine to learn a data entry pattern from the one or more finger gestures using deep learning and tiny machine learning ("ML");
transmit, from the smart device to an external user interface ("UI"), the one or more documents data based on the data entry pattern; and
process the at least one document transaction.

2. The smart device of claim 1 wherein the communication circuit is configured to communicate with a remote digital signal processor, and wherein the remote digital signal processor is configured to:
identify at least one object within the radar field;
analyze any movement of the at least one object within the radar field using a Doppler method;
convert the movement of the at least one object into gestures or writing symbols; and
translate the writing symbols into words, numerals, or symbols.

3. The smart device of claim 1 wherein the radar field is continuous while the radar transmitter is active.

4. The smart device of claim 1 wherein the radar field has a depth between six inches and fifteen feet.

5. The smart device of claim 1 wherein the radar field is pulsed.

6. The smart device of claim 1 wherein the radar transmitter operates at a frequency between 3 GHz and 300 GHz.

7. The smart device of claim 1 wherein the communication circuit further comprises a cellular antenna.

8. The smart device of claim 1 wherein the communication circuit further comprises a wi-fi antenna.

9. The smart device of claim 1 further comprising an encryption controller.

10. The smart device of claim 1 wherein the non-transitory memory further comprises executable instructions and at least one datum configured to authenticate a user.

11. A method for providing contact-minimized interaction with smart device, said method comprising:
sensing, at the smart device, one or more finger movements of one or more fingers of a user;
identifying, at the smart device, a document associated with the one or more finger movements;
activating, at the smart device, a Doppler millimeter-wave radar transmitter;
transmitting, from the radar transmitter, a radar field;
prompting, by the smart device, the user to write within the radar field an authentication passcode;

receiving, at a radar receiver, Doppler radar reflections from at least one object within the radar field;

digitizing, at the smart device, the Doppler radar reflections;

processing, at a digital signal processor ("DSP") at the smart device, the Doppler radar reflections;

identifying, at the DSP, at least one target of the one or more fingers, wherein the at least one target is all or a portion of the at least one object;

resolving and analyzing, at the DSP, movement of the at least one target;

translating, at the DSP, the movement of the at least one target into gestures, words, numerals, or symbols, the gestures, words, numerals, or symbols including a double deliberate finger gesture when any of the document is inaccurate, a triple deliberate finger gesture to cancel the contact-minimized interaction with the smart device, and a prolonged single deliberate gesture to override the contact-minimized interaction with the smart device thereby enabling the user to manually enter data into a data entry field;

sending, from the smart device to an authentication server, the gestures, words, numerals, or symbols;

authenticating the document, at the authentication server, by matching the gestures, words, numerals, or symbols to gestures, words, numerals or symbols associated with an authentication passcode of the user;

informing, by the authentication server, the smart device when the user has correctly provided the authentication passcode;

deleting, at the smart device, any inaccuracies in the document;

making, at the smart device, one or more corrections to the document;

storing, at the smart device, the document;

using, at the smart device, an intelligent bulk data entry engine in synchronization with a data entry orchestration engine to learn a data entry pattern from the gestures, words, numerals, or symbols using deep learning and tiny machine learning ("ML");

transmitting, from the smart device to an external user interface ("UI"), the document, based on the data entry pattern;

displaying, at the smart device, a plurality of document transaction options for the document, in response to the user correctly providing the authentication passcode;

selecting, at the smart device, at least one document transaction through at least one gesture in the radar field; and processing, at the smart device, the at least one document transaction.

12. The method of claim 11 further comprising:
employing, at the DSP, at least one machine learning algorithm to:
identify the at least one target;
resolve the movement of the at least one target; and
translate the movement into gestures, words, numerals, and symbols.

13. The method of claim 11 wherein the at least one object is a hand of the user.

14. The method of claim 13 wherein the at least one target is a finger on the hand of the user.

15. A method for providing contact-minimized interaction with a smart device, said method comprising:
sensing, at the smart device, one or more finger movements of one or more fingers of a user;

identifying, at the smart device, a document associated with the one or more finger movements;

activating, at the smart device, a Doppler millimeter-wave radar transmitter;

transmitting, from the radar transmitter, a radar field;

prompting, by the smart device, the user to write within the radar field an authentication passcode;

receiving, at a radar receiver, Doppler radar reflections from at least one object within the radar field;

digitizing, at the smart device, the Doppler radar reflections;

sending, from the smart device, the digitized Doppler radar reflections to a remote digital signal processor ("DSP");

processing, at the remote DSP, the Doppler radar reflections;

identifying, at the remote DSP, at least one target of the one more fingers, wherein the at least one target is all or a portion of the at least one object;

resolving and analyzing, at the remote DSP, movement of the at least one target;

translating, at the remote DSP, the movement of the at least one target into gestures, words, numerals, or symbols, the gestures, words, numerals, or symbols including a double deliberate finger gesture when any of the document is inaccurate, a triple deliberate finger gesture to cancel the contact-minimized interaction with the smart device, and a prolonged single deliberate gesture to override the contact-minimized interaction with the smart device thereby enabling the user to manually enter data into a data entry field;

sending, from the remote DSP to an authentication server, the gestures, words, numerals, or symbols;

authenticating the document, at the authentication server, by matching the gestures, words, numerals, or symbols to gestures, words, numerals, or symbols associated with the document;

informing, by the authentication server, the smart device when the user has correctly provided the authentication passcode;

deleting, at the smart device, any inaccuracies in the document;

making, at the smart device, one or more corrections to the document;

storing, at the smart device, the document;

using, at the smart device, an intelligent bulk data entry engine in synchronization with a data entry orchestration engine to learn a data entry pattern from the gestures, words, numerals, or symbols using deep learning and tiny machine learning ("ML");

transmitting, from the smart device to an external user interface ("UI"), the document, based on the data entry pattern;

displaying, at the smart device, a plurality of document transaction options for the document, in response to the user correctly providing the authentication passcode;

selecting, at the smart device, at least one document transaction through at least one gesture in the radar field; and processing, at the smart device, the at least one document transaction.

16. The method of claim 15 further comprising:
employing, at the DSP, at least one machine learning algorithm to:
identify the at least one target;
resolve the movement of the at least one target; and translate the movement into gestures, words, numerals, and symbols.

17. The method of claim 15 wherein the at least one object is a hand of the user.

18. The method of claim 17 wherein the at least one target is a finger on the hand of the user.

* * * * *